(12) United States Patent
Asai et al.

(10) Patent No.: US 6,412,984 B2
(45) Date of Patent: Jul. 2, 2002

(54) DYNAMIC PRESSURE BEARING APPARATUS

(75) Inventors: Hiromitsu Asai; Yoichiro Sugimori, both of Fujisawa (JP)

(73) Assignee: NSK Ltd., Tokyo (JP)

(*) Notice: Subject to any disclaimer, the term of this patent is extended or adjusted under 35 U.S.C. 154(b) by 0 days.

(21) Appl. No.: 09/733,997

(22) Filed: Dec. 12, 2000

Related U.S. Application Data

(63) Continuation of application No. 09/311,160, filed on May 13, 1999, now abandoned.

(30) Foreign Application Priority Data

| May 14, 1998 | (JP) | ............. | 10-132008 |
| May 28, 1998 | (JP) | ............. | 10-147297 |
| Jul. 31, 1998 | (JP) | ............. | 10-217926 |

(51) Int. Cl.[7] .................................. F16C 17/10
(52) U.S. Cl. ........................................ 384/107
(58) Field of Search ............................ 384/107, 112, 384/115, 123, 114

(56) References Cited

U.S. PATENT DOCUMENTS 5,791,784 A * 8/1998 Ichiyama ............... 384/107
5,806,987 A * 9/1998 Nose et al. ............ 384/100

* cited by examiner

Primary Examiner—Lenard A. Footland
(74) Attorney, Agent, or Firm—Miles & Stockbridge P.C.

(57) ABSTRACT

The present invention provides a dynamic pressure bearing apparatus comprising a cylindrical bearing member, and a rotary shaft disposed within a cylindrical bore of the cylindrical bearing member, and wherein the bearing member has a thrust bearing surface provided at a bottom of the cylindrical bore, a radial bearing surface provided on an inner peripheral surface of the cylindrical bearing member, and a lubricating oil reservoir provided at an opening portion of the cylindrical bore and having a diameter greater than that of the radial bearing surface, and the rotary shaft has a radial receiving surface opposed to the radial bearing surface with the interposition of a radial bearing gap, and a thrust receiving surface opposed to the thrust bearing surface, and further wherein the bearing member is closed at the bottom thereof, a dynamic pressure generating groove is formed in at least one of the radial bearing surface and the radial receiving surface, and the dynamic pressure generating groove generates a force for flowing lubricating oil between the bearing member and the rotary shaft toward the opening portion of the cylindrical bore.

10 Claims, 14 Drawing Sheets

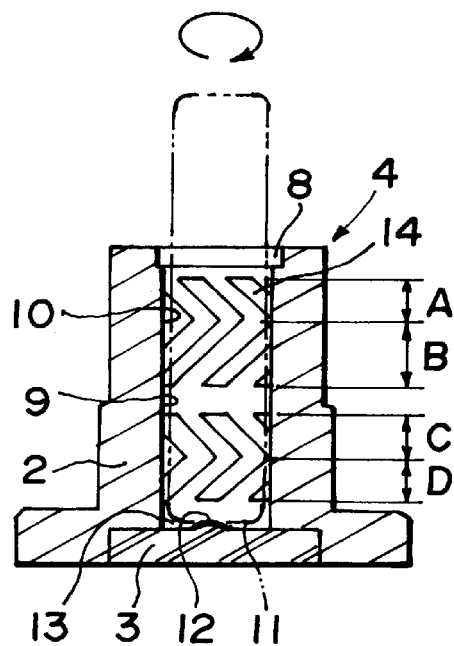
F I G. 2
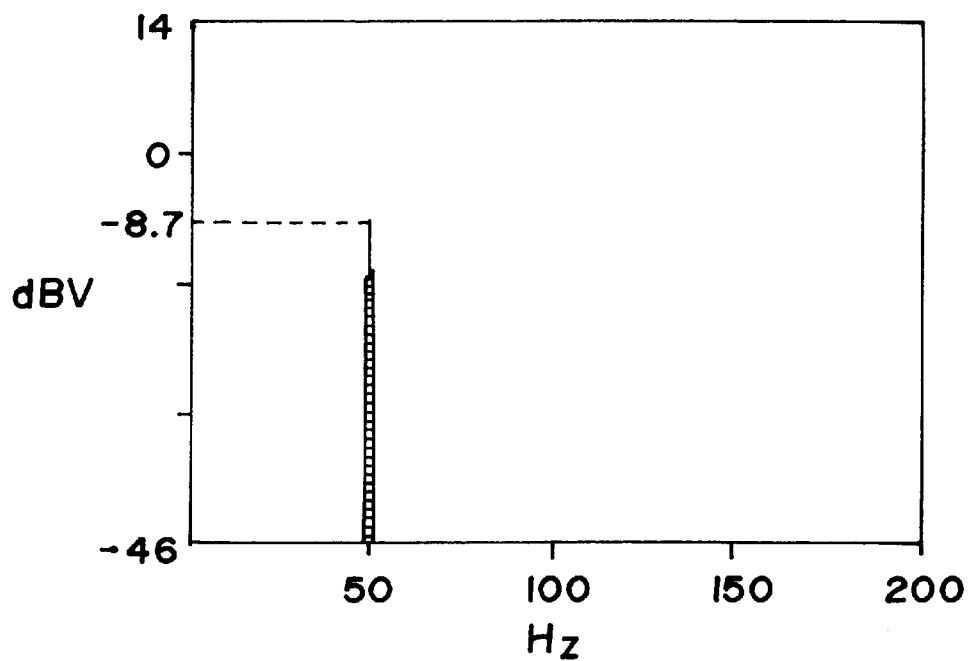
F I G. 3

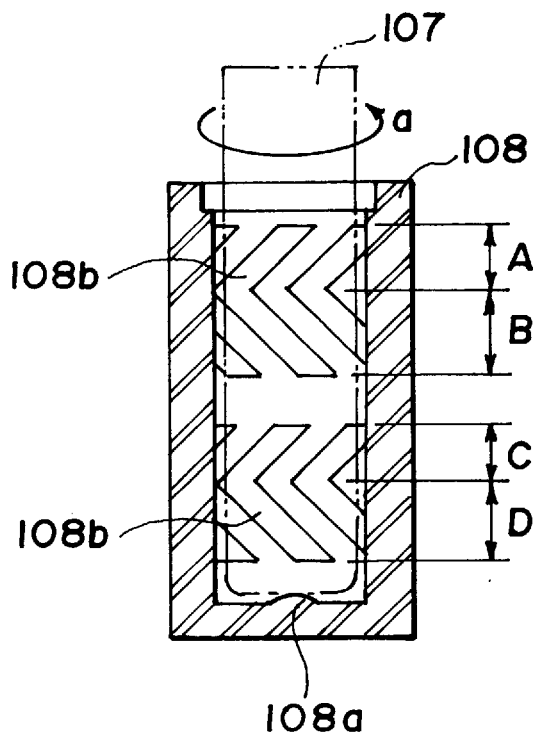
F I G. 9
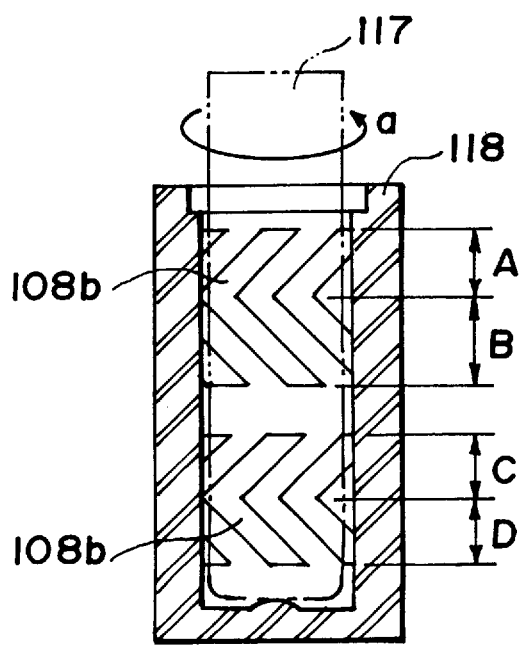
F I G. 10

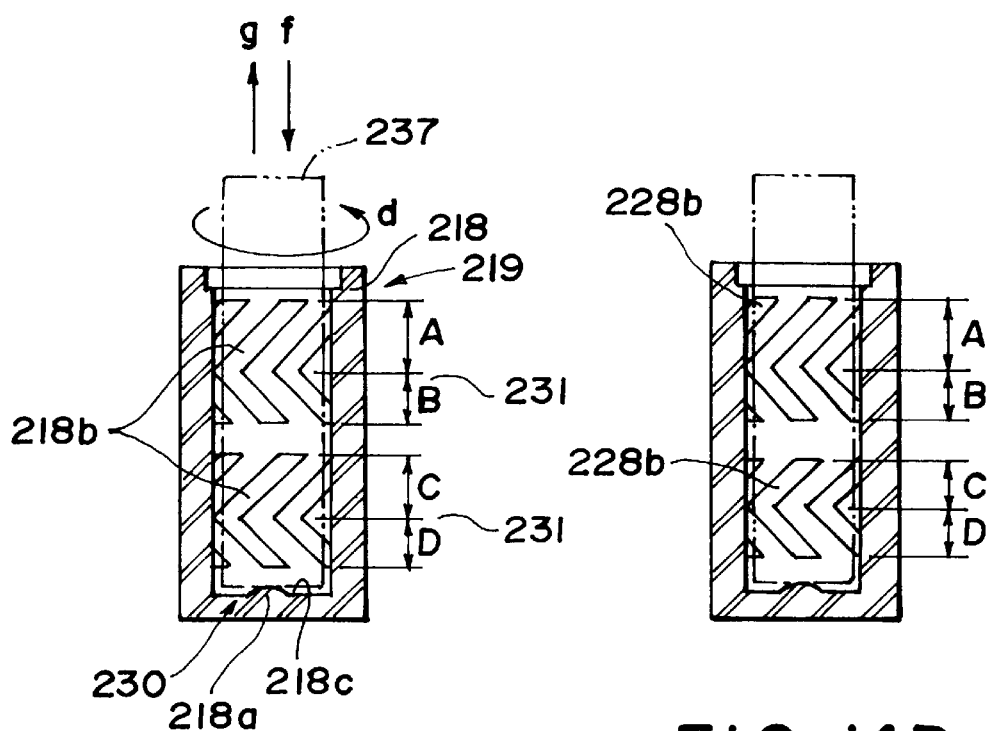
FIG. 14A
FIG. 14B
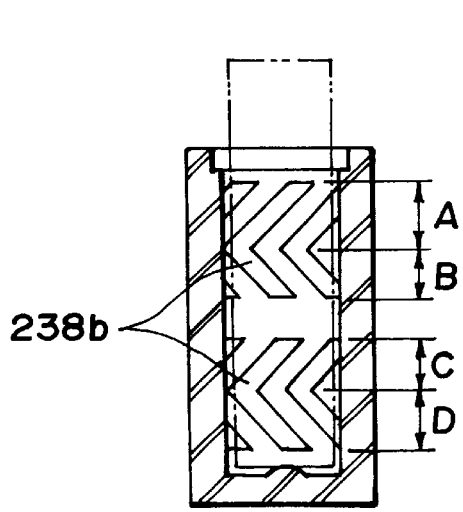
FIG. 14C
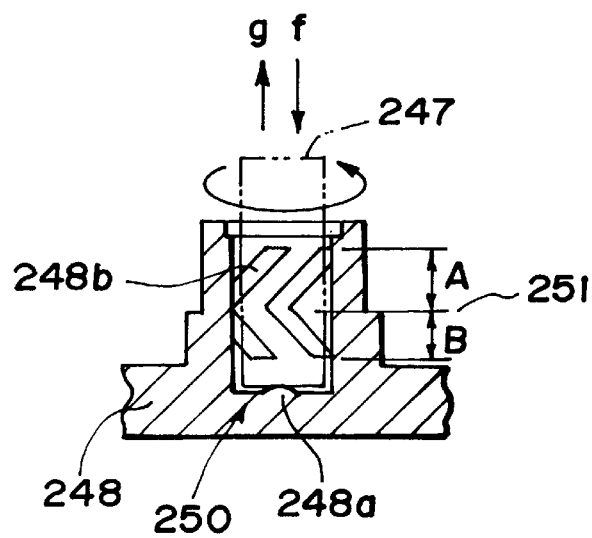
FIG. 14D

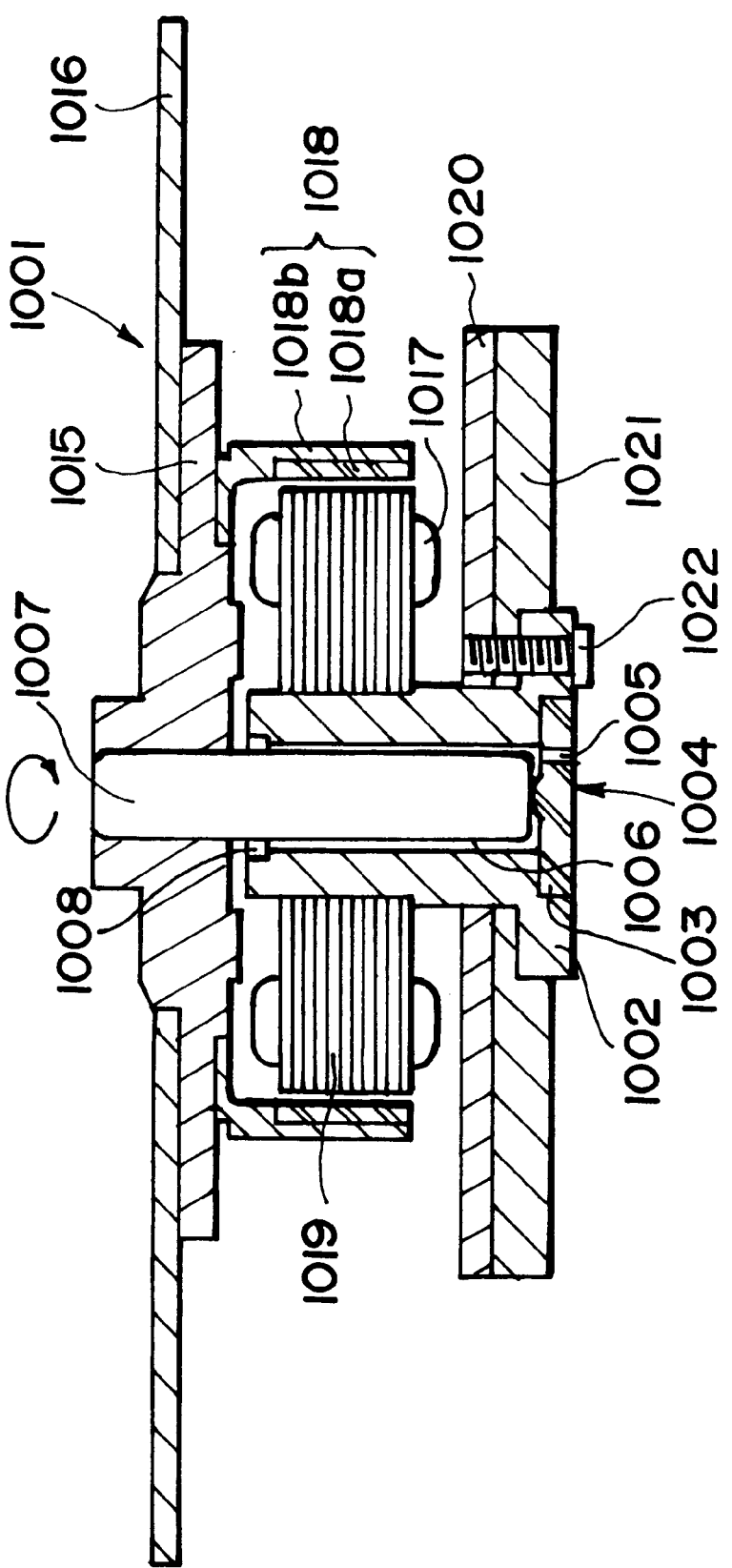

DYNAMIC PRESSURE BEARING APPARATUS

CROSS REFERENCE TO RELATED APPLICATIONS

This application is a continuation of application Ser. No. 09/311,160 filed May 13, 1999, abandoned.

BACKGROUND OF THE INVENTION

1. Field of the Invention

The present invention relates to a dynamic pressure bearing apparatus for a spindle motor used with information equipments, acoustic equipments or imaging equipments, particularly for a spindle motor suitable for optical disc devices and magnetic disc devices, and, a dynamic pressure bearing apparatus for a fan motor, particularly using a radial/thrust integral resin bearings, and more particularly, it relates to a dynamic pressure bearing apparatus for a fan motor, which has excellent performance and endurance and which can easily be worked and assembled.

2. Related Background Art

Conventionally, although a bearing apparatus utilizing a sliding bearing or a ball bearing has been used in such a system, recently, due to request for high speed transferring of data, higher speed rotation of a rotary member (shaft) has been requested. As a result, there arose a problem that whirling of the rotary member is increased by the influence of a centrifugal force. To minimize an amount of the whirling, a dynamic pressure bearing apparatus (dynamic pressure spindle motor) utilizing a dynamic pressure bearing has been used.

An example of a conventional dynamic pressure bearing apparatus is shown in FIG. 15 which is a sectional view. FIG. 16 is an enlarged view showing a bearing member of FIG. 15. In this conventional example, a bearing member 1004 defines a cylindrical bore 1013 including a metallic sleeve 1002 and a thrust bearing member 1003, and the sleeve 1002 has an inner diameter surface 1009 which is provided with dynamic pressure generating grooves 1014 to define a radial bearing surface 1010. In the thrust bearing member 1003 connected to the sleeve 1002, a thrust bearing surface 1012 defining a part of the cylindrical bore 1013 has a convex spherical shape to provide a sliding bearing. The thrust bearing member 1003 has a vent hole 1005. A turn table 1015 is attached to a shaft 1007 which is driven by a rotor 1018 and a stator 1019.

In the dynamic pressure generating grooves 1014, when it is assumed that axial lengths from bent portions to upper (open) sides are A, C and axial lengths from the bent portions to lower (bottom) sides are B, D, relationships A>B, C>D and (A+C)>(B+D) are established, and, thus, the grooves are asymmetrical in the axial direction. The reason is that, by generating axial load capacity, a thrust force for floating the shaft 1007 (rotor) is generated to prevent the bearing portions (particularly, lower portion of the radial bearing and the thrust bearing) from being subjected to negative pressure. If the bearing portions are subjected to the negative pressure, the whirling (of the shaft) will be generated to worsen bearing performance.

On the other hand, since the thrust bearing surface 1012 has the vent hole 1005 at its one end, when the shaft 1007 is inserted into the bearing, lubricating oil leaks through the vent hole 1005, thereby not ensuring reservation of the lubricating oil. Further, in an inoperative condition of the bearing after insertion of the shaft 1007, if an environmental temperature is increased, viscosity of the lubricating oil is decreased, and the lubricating oil may leak through the vent hole 1005.

To prevent the leakage of the lubricating oil, there has been proposed a dynamic pressure bearing apparatus (not shown) of type which has similar construction as that shown in FIG. 16 but has no vent hole 1005 in the thrust bearing member 1003.

However, in the type having no vent hole 1005, when the bearing is operated, oil in an oil reservoir 1008 is sucked toward the bottom, which causes a new problem that the rotary members (shaft, rotor, turn table, disc) are floating above the thrust bearing surface 1012. It is very difficult to suppress such floating particularly when a circumferentially opposed motor (in which a rotor 1018 and a stator 1019 are opposed to each other in a radial direction) is used.

A floating amount of the rotary members depends upon an amount of oil in the oil reservoir 1008.

In a disc driving system, in which a disc 1016 rotated, when the disc is floating due to rotation of the drive, a gap between the disc and a recording/reproducing head is decreased to make recording/reproducing impossible. The space (gap) between the recording/reproducing head and the surface of the disc in the disc driving system must be maintained with high accuracy. Thus, some control for the floating amount of the shaft is required in the bearing apparatus.

However, for this requirement, the floating of the rotor cannot be prevented by using the above-mentioned groove pattern.

On the other hand, an example of a conventional fan motor used in office equipments is described in Japanese Utility Model Registration No. 2553251. FIG. 17 is a sectional view showing a conventional dynamic pressure bearing apparatus for a fan motor. A rotor 2031 is secured to an inner peripheral surface of a support member 2033, and vanes 2030 are secured to an outer peripheral surface of the support member 2033. The rotor 2031 is constituted by a magnet 2032. The support member 2033 is secured to one end of a rotary shaft 2037 having a dynamic pressure generating portion (dynamic pressure generating grooves 2036). A cylindrical sleeve 2035 is mounted on a central portion of a case 2039, and a stator 2034 is secured to an outer peripheral surface of the sleeve 2035 in a confronting relation to the rotor 2031. Below the sleeve 2035, a resin receiver member 2040 for supporting the rotary shaft 2037 is attached to the case 2039. A dynamic pressure bearing 2038 is constituted by rotatably fitting the rotary shaft 2037 into the sleeve 2035, and a cylindrical space formed between the sleeve 2035 and the rotary shaft 2037 is filled with grease 2041. The vanes 2030 and the rotor 2031 are supported in the radial direction via the dynamic pressure bearing 2038 so that the vanes 2030 and the rotor 2031 can be rotated around the stator 2034. That is to say, the rotor 2031 is rotated by a rotational magnetic field generated by the stator 2034 to rotate the vanes 2030 (in a direction shown by the arrow Z in FIG. 17), thereby generating air streams directing toward a direction shown by the arrow X to effect air blast. A thrust load (shown by the arrow Y) acting on the rotary shaft 2037 as a thrust force generated by rotation of the vanes 2030 (reaction force of the blasting operation) is supported by an axial component of an attracting force acting between an iron core (not shown) of the stator 2034 and the magnet 2032 of the rotor 2031. The stator 2034 and the rotor 2031 are offset in the axial direction so that the attracting force becomes greater than the thrust force generated by the rotation of the vanes 2030 by a predetermined rate. By the remaining axial component thrust load obtained by subtracting the thrust force of the vanes 2030 from the attracting force acting between the stator 2034 and the rotor 2031, an end surface of the rotary shaft 2037 is urged against the resin receiver member 2040 of the case 2039 to support the rotary shaft.

However, in the conventional bearing for the fan motor, since the number of parts of the bearing is increased (i.e., becomes two; radial bearing and thrust receiver member (resin receiver member 2040)), the assembling steps are increased and the construction of the bearing becomes complicated. Further, since perpendicularity of the end surface of the rotary shaft 2037 supporting the thrust load must be maintained with high accuracy, the apparatus cannot be made cheaper. In addition, since the end surface of the shaft and the surface of the receiver member which support the thrust load are flat, the peripheral edge of the end surface of the shaft contacts with the surface of the receiver member to easily damage the latter. Further, since the rotor 2031 is attracted in the axial direction by the magnetic force opposite to the thrust force of the vanes 2030 (in the axial direction) by offsetting the stator 2034 with respect to the rotor 2031 in the axial direction so as to become the axial component of the attracting force acting between the iron core of the stator 2034 and the magnet 2032 of the rotor 2031 greater than the thrust force of the vanes 2030, the axial dimension becomes great and precludes compactness (thinness) of the apparatus. Also, since the stator 2034 is greatly offset with respect to the rotor 2031 in the axial direction, the rotary shaft 2037 and the vanes 2030 are apt to be vibrated and noise is apt to be generated.

Further, since the thrust force generated by the rotation of the vanes 2030 is increased as the number of rotations of the vanes is increased, the magnet 2032 must generate the opposite magnetic force greater than the thrust force generated during steady-state rotation. In this case, in low speed rotation generating smaller thrust force of the vanes 2030, a greater thrust load acts on the thrust receiver member to wear the latter. In addition, since the grease is used as the lubricating agent, it is difficult to expel the air from the interior of the bearing when the rotary shaft 2037 is inserted. Thus, a relatively large amount of air remains within the bearing, which results in reduction of performance of the dynamic pressure bearing and increased torque.

SUMMARY OF THE INVENTION

The present invention aims to eliminate the above-mentioned conventional drawbacks and has been created on the basis of a new technique.

A first object of the present invention is to provide a dynamic pressure bearing apparatus comprising a cylindrical bearing member, and a rotary shaft disposed within a cylindrical bore of the cylindrical bearing member, and wherein the bearing member has a thrust bearing surface provided at a bottom of the cylindrical bore, a radial bearing surface provided on an inner peripheral surface of the cylindrical bearing member, and a lubricating oil reservoir provided at an opening portion of the cylindrical bore and having a diameter greater than that of the radial bearing surface, and the rotary shaft has a radial receiving surface opposed to the radial bearing surface with the interposition of a radial bearing gap, and a thrust receiving surface opposed to the thrust bearing surface, and further wherein the bearing member is closed at the bottom thereof, a dynamic pressure generating groove is formed in at least one of the radial bearing surface and the radial receiving surface, and the dynamic pressure generating groove generates a force for flowing lubricating oil between the bearing member and the rotary shaft toward the opening portion of the cylindrical bore.

In a first embodiment of the present invention, since the radial bearing gap is closed at the bottom, the lubricating oil is surely loaded within the bearing without leakage, and, since the dynamic pressure generating grooves of the radial dynamic pressure bearing are constituted as grooves to generate a thrust force for urging the shaft against the thrust bearing surface, a dynamic pressure bearing apparatus for a spindle motor, in which the shaft is not floating regardless of a rotational speed of the shaft can be realized.

From an investigation of the dynamic pressure bearing apparatus according to the present invention, optimum values of an outer diameter of the rotary shaft, the radial bearing gap and axial lengths of the dynamic pressure generating grooves were determined concretely.

Thus, the present invention provides a dynamic pressure bearing apparatus wherein an outer diameter of the rotary shaft is 2 mm to 5 mm, and the radial bearing gap is 3 $\mu$m to 10 $\mu$m, and each of the dynamic pressure generating grooves has a laid V-shaped configuration in which a ratio between an axial length of a groove portion extending from a bent portion of "V" toward the opening portion of the cylindrical bore and an axial length of a groove portion extending from the bent portion toward the bottom of the cylindrical bore is selected to 15:16 to 3:4.

By selecting the values of the outer diameter of the rotary shaft, the radial bearing gap and the ratio of the axial lengths of the dynamic pressure generating grooves to the above-mentioned concrete values, a dynamic pressure bearing apparatus can be realized in which the shaft is not floating regardless of a rotational speed of the shaft and in which substantially no non-rotational component (including whirling) is generated.

A second object of the present invention is to provide a dynamic pressure bearing apparatus for a fan motor, which has a simple construction and can be made compact while adequate performance can nonetheless be ensured.

According to a second embodiment of the present invention, there is provided a dynamic pressure bearing apparatus for a fan motor, comprising a radial/thrust integrating resin sleeve having a radial bearing portion including dynamic pressure generating grooves formed in an inner surface of the cylindrical portion formed by injection molding, and a thrust bearing portion contiguous to the radial bearing portion and formed on a bottom of the cylindrical portion. By constituting the dynamic pressure bearing by the radial/thrust integrating resin sleeve in this way, since manufacture is facilitated and the number of parts is reduced and assembling is also facilitated, the entire bearing apparatus can be made cheaper.

Particularly, when the dynamic pressure generating grooves (radial dynamic pressure bearing portion) formed in an inner surface of the cylindrical portion of the sleeve have a groove pattern capable of supporting a load in a radial direction and generating a force acting toward a direction opposite to a direction of a thrust force of vanes, a construction can be made simpler and an axial dimension can be reduced, whereby the entire apparatus can be made more compact (thinner). More specifically, the design may be such that a lower width of the groove pattern is greater than an upper width of the groove pattern. With this arrangement, since it is not required that the stator is greatly offset from the rotor in the axial direction, the vanes are not readily vibrated in the axial direction and occurrence of noise is prevented. Alternatively, the dynamic pressure generating grooves may be also formed in the rotary shaft. In this case, the rotary shaft becomes a dynamic pressure bearing portion having the dynamic pressure generating grooves formed in the outer peripheral surface of the shaft, which gives the same advantage as the dynamic pressure generating grooves formed in the sleeve.

Further, when the radial/thrust integrating resin sleeve is used and one of a free end surface of the rotary shaft and the thrust bearing surface has a spherical face to support the thrust load in a point contact fashion, low friction is ensured, so that the thrust bearing surface is not damaged by the edge of the shaft. More specifically, a convex spherical face may be formed on a thrust receiving member at the bottom of the resin sleeve to support the end surface of the rotary shaft, or a convex spherical face may be formed on the end surface of the rotary shaft to be supported by the thrust receiving member at the bottom of the resin sleeve. Since the radial bearing is also formed from resin, starting friction resistance can be reduced (the shaft is contacted with the inner surface of the sleeve at the starting and stopping), thereby ensuring low friction to achieve excellent wear-resistance in the entire bearing apparatus. Resin materials having great strength and excellent wear-resistance are preferable, but, the resin is not limited to specific resin material. For example, the resin may be PPS (polyphenylene sulfide resin) including carbon fibers. By using the oil as the lubricating agent, air in the bearing can easily be expelled during insertion of the rotary shaft. Thus, since almost no air remains within the bearing, performance of the dynamic pressure bearing is preserved. When the oil is used as the lubricating agent, torque can be reduced in comparison with grease.

In the second embodiment, the dynamic pressure bearing apparatus for a fan motor comprises a cylindrical bearing member, and a rotary shaft disposed within a cylindrical bore of the cylindrical bearing member and having one end rotatably supporting a vane and a rotor and the other end being a free end. The bearing member has a thrust bearing surface provided at a bottom of the cylindrical bore, a radial bearing surface formed on an inner peripheral surface of the cylindrical bearing member, and a lubricating oil reservoir provided at an opening portion of the cylindrical bore and having a diameter greater than that of the radial bearing surface; a stator is disposed around the bearing member in a confronting relation to the rotor; and the bearing member is made of resin and is closed at its bottom. A dynamic pressure generating groove is formed in at least one of the radial bearing surface and a radial receiving surface to direct the thrust force generated by the rotation of the vane toward the thrust bearing surface; and a spherical face is formed on one of the free end of the rotary shaft and the thrust bearing surface.

In the dynamic pressure bearing apparatus for a fan motor, the dynamic pressure generating groove has a groove pattern for generating a force directing toward an axial direction opposite to a direction of the thrust force generated by rotation of the vane, and the axial force generated by the dynamic pressure generating groove is smaller than the axial force generated by the rotation of the vane.

A further object of the present invention is to provide a dynamic pressure bearing apparatus for a fan motor, which has excellent performance and endurance and can easily be worked and in which the number of parts is small to facilitate assembling and to make the entire apparatus cheaper.

A still further object of the present invention is to provide a dynamic pressure bearing apparatus for a fan motor, in which a thrust load in a thrust bearing portion is reduced to achieve low torque and low friction.

In a further embodiment of the present invention, there is provided a dynamic pressure bearing apparatus for a fan motor, comprising a radial/thrust integrating resin sleeve having a radial dynamic pressure bearing portion including dynamic pressure generating grooves formed in an inner surface of the cylindrical portion formed by injection molding, and a thrust bearing portion contiguous to the radial bearing portion and formed on a bottom of the cylindrical portion, which can easily be worked and assembled and in which the number of parts is small. Since a thrust force generated by rotation of vanes is directed toward the thrust bearing portion, it is not required that a force for attracting a rotor in an axial direction becomes greater than the thrust force. Since blasted air generated by the rotation of the vanes acts on upper sides of the vanes, the thrust load acting on the rotary shaft is directed toward the thrust bearing portion (for urging the rotary shaft against the thrust bearing surface). Thus, it is not required that the stator is greatly offset from the rotor in the axial direction. Since the radial bearing is also formed from resin, starting friction resistance can be reduced (the shaft is contacted with the inner surface of the sleeve at the starting and stopping). By using the oil as the lubricating agent, air in the bearing can easily be expelled during insertion of the rotary shaft. Thus, since almost no air remains within the bearing, performance of the dynamic pressure bearing is preserved. When the oil is used as the lubricating agent, torque can be reduced in comparison with grease.

When the radial/thrust integrating resin sleeve is used as the resin sleeve and one of the free end surface of the rotary shaft and the thrust bearing surface has the spherical face to support the thrust load in the point contact fashion, it is not required that perpendicularity of the end surface of the rotary shaft supporting the thrust load is maintained with high accuracy. More specifically, the convex spherical face may be formed on the thrust receiving member at the bottom of the resin sleeve to support the end surface of the rotary shaft, or the convex spherical face may be formed on the end surface of the rotary shaft to be supported by the thrust receiving member at the bottom of the resin sleeve. Resin materials having great strength and excellent wear-resistance are preferable, but, the resin is not limited to specific resin material. For example, the resin may be PPS (polyphenylene sulfide resin) including carbon fibers.

In a still further embodiment of the present invention, there is provided a dynamic pressure bearing apparatus for a fan motor, wherein dynamic pressure generating grooves formed in an inner surface of a resin sleeve have a groove pattern for generating an axial force acting toward a direction opposite to a thrust force generated by rotation of vanes of the fan motor. When the axial force generated by the dynamic pressure generating grooves is smaller than the axial force generated by the rotation of the vanes and the remaining thrust load obtained by subtracting the axial force generated by the dynamic pressure generating grooves from the thrust force generated by the rotation of the vanes acts on the end surface of the rotary shaft and the thrust bearing surface, the thrust load acting on the thrust bearing portion can be reduced.

Particularly, when the dynamic pressure generating grooves (radial dynamic pressure bearing portion) formed in the inner surface of the cylindrical portion of the sleeve have the groove pattern capable of supporting a load in a radial direction and generating the force acting toward the direction opposite to the direction of the thrust force generated by the rotation of the vanes, since a construction can be made simpler and an axial dimension can be reduced, the entire apparatus can be made more compact (thinner). More specifically, the design is such that an upper width of the groove pattern is greater than a lower width of the groove pattern. With this arrangement, since it is not required that the stator is greatly offset from the rotor in the axial direction, the vanes are not readily vibrated in the axial direction during the rotation of the vanes and occurrence of noise is prevented.

In a third embodiment of the present invention, the dynamic pressure bearing apparatus for a fan motor comprises a cylindrical bearing member, and a rotary shaft disposed within a cylindrical bore of the cylindrical bearing member and having one end rotatably supporting a vane and a rotor and the other end being a free end. The bearing member has a thrust bearing surface provided at a bottom of the cylindrical bore, a radial bearing surface formed on an inner peripheral surface of the cylindrical bearing member, and a lubricating oil reservoir provided at an opening portion of the cylindrical bore and having a diameter greater than that of the radial bearing surface; a stator is disposed around the bearing member in a confronting relation to the rotor; and the bearing member is made of resin and is closed at its bottom. A dynamic pressure generating groove is formed in at least one of the radial bearing surface and a radial receiving surface to direct a thrust force generated by the rotation of the vane away from the thrust bearing surface; and a spherical face is formed on one of the free end of the rotary shaft and the thrust bearing surface.

In the dynamic pressure bearing apparatus for a fan motor according to this embodiment, the dynamic pressure generating groove has a groove pattern for generating a force directing toward an axial direction opposite to a direction of the thrust force generated by the rotation of the vane, and the axial force generated by the dynamic pressure generating groove is greater than the axial force generated by the rotation of the vane.

BRIEF DESCRIPTION OF THE DRAWINGS

FIG. 2 is an enlarged view of a main part of FIG. 1;

FIG. 3 is a graph showing test results of the present invention;

FIG. 9 is a sectional view of a dynamic pressure bearing portion of FIG. 8;

FIG. 10 is a sectional view of a resin sleeve (bearing portion) showing a groove pattern of dynamic pressure generating grooves according to a fifth embodiment of the present invention;

FIGS. 14A, 14B, 14C and 14D are sectional views of a resin sleeve (dynamic pressure bearing portion) according to a ninth embodiment of the present invention, where FIG. 14A is a sectional view of a resin sleeve (dynamic pressure bearing portion) showing a first example of dynamic pressure generating grooves, FIG. 14B is a sectional view of a resin sleeve (dynamic pressure bearing portion) showing a second example of dynamic pressure generating grooves, FIG. 14C is a sectional view of a resin sleeve (dynamic pressure bearing portion) showing a third example of dynamic pressure generating grooves, and FIG. 14D is a sectional view of a resin sleeve (dynamic pressure bearing portion) showing a fourth example in which dynamic pressure generating grooves are disposed in a single row;

FIG. 15 is a sectional view of a conventional dynamic pressure bearing apparatus;

DETAILED DESCRIPTION OF THE PREFERRED EMBODIMENTS (First Embodiment)

Figure 1:
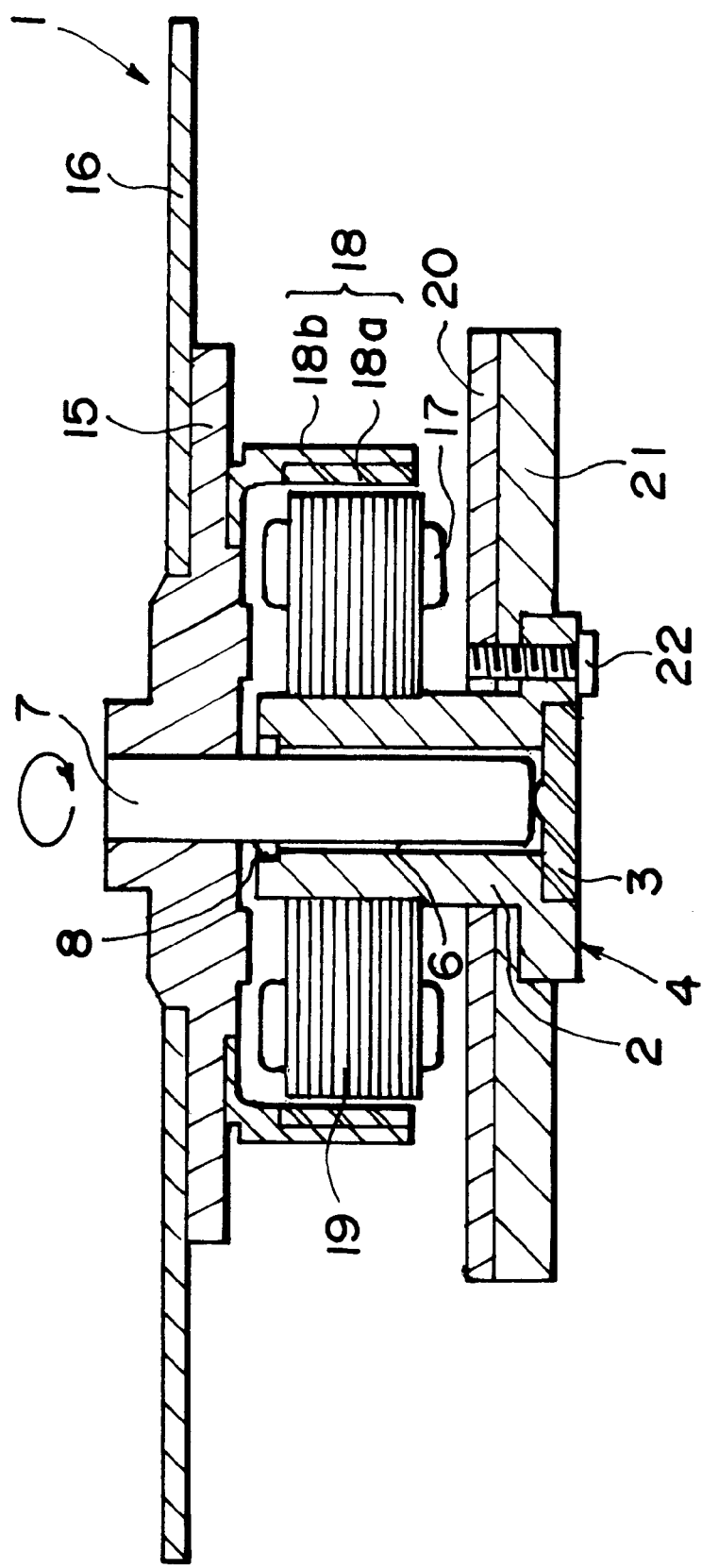
FIG. 1 is a sectional view of a dynamic pressure bearing apparatus according to a first embodiment of the present invention.

Now, a first embodiment of the present invention will be explained with reference to the accompanying drawings. FIG. 1 is a sectional view of a dynamic pressure bearing apparatus according to a first embodiment of the present invention, and FIG. 2 is a sectional view showing only a bearing portion of the first embodiment.

As shown in FIG. 1, a spindle motor 1 according to the first embodiment includes a shaft 7, a radial bearing member 2, a bearing member 4, and a turn table 15. The shaft 7 is rotatably inserted into the bearing member 4. The bearing member has a cylindrical radial bearing surface 10 having dynamic pressure generating grooves formed in an inner peripheral surface 9 of a metallic sleeve (radial bearing member) 2, and a synthetic resin thrust bearing surface 12 formed on a thrust bearing member 3 contiguous to the radial bearing surface 10. The thrust bearing surface 12 has a convex spherical configuration to provide a sliding bearing in which a central convex spherical face is slidingly contacted with a flat thrust receiving surface 11 of the shaft 7.

A peripheral edge portion of the bearing member 4 is secured to a motor base 21 and a substrate 20 by screws 22. A stator 19 is secured to an outer peripheral surface of the sleeve 2. The stator 19 has a coil 17, and a rotor 18 is disposed radially outwardly of the stator 19 in a confronting relation to the stator 19. The rotor and the stator constitute a driving mechanism for the motor. The rotor 18 is secured to the shaft 7 having an outer diameter of 2 mm to 5 mm via the turn table 15. The rotor 18 comprises a magnet 18a, and a rotor attaching member 18b for attaching the magnet 18a. The turn table 15 on which a disc 16 is mounted is secured to an upper end of the shaft 7. The rotor 18 is opposed to the stator 19 secured to the sleeve 2.

In the present invention, as shown in FIG. 2, the dynamic pressure generating groove 14 has a herringbone-shaped groove pattern. A plurality of spaced laid V-shaped grooves are formed in the outer peripheral surface of the shaft 7 in two rows. A groove portion extending from a bent portion of the "V" toward an opening portion of a cylindrical bore 13 of the sleeve generates a force for shifting lubricating oil toward a bottom, and a groove portion extending from the bent portion toward the bottom generates a force for shifting the lubricating oil toward the opening portion. In the two row grooves, when it is assumed that axial lengths (widths) of the upper groove portions extending from the bent portions toward the opening portion are A, C and axial lengths of the lower groove portions extending from the bent portions toward the bottom are B, D, the lengths A, C are smaller than the lengths B, D, respectively (i.e., A<B, C<D) so that the widths of the lower groove portions are greater than the widths of the upper groove portions in both of two rows. A ratio between (A+C) and (C+D) is selected to 15:16 to 3:4. A value of a radial bearing gap (between the radial bearing surface and the radial receiving surface) is selected to 3 $\mu$m to 10 $\mu$m.

When the rotating members (shaft, rotor, turn table, disc) are rotated in a direction shown by the arrow (clockwise direction looked at from above), the dynamic pressure generating grooves 14 formed in the inner peripheral surface 9 of the sleeve generate pressure. In this case, since the groove pattern is asymmetrical in the axial direction as mentioned above, as well as a radial direction force, a thrust direction force for urging the shaft 7 against the thrust bearing member 3 is generated, thereby preventing the shaft 7 from floating. Thus, since the disc is not contacted with a recording/reproducing head to damage the former, there is no problem regarding the recording/reproducing. Regarding an amount of the lubricating oil, so long as the dynamic pressure generating grooves 14 are wetted by the lubricating oil the lubricating oil may be spilled over the cylindrical bore during the insertion of the shaft 7 to return back to a lubricating oil reservoir 8. Thus, the operator need not pay attention to the loading amount of the lubricating oil carefully.

Further, since there is no vent hole, the lubricating oil does not leak through the vent hole during the insertion of the shaft 7, and, after the shaft 7 was inserted, even if the temperature is increased in a non-operating state of the bearing, the lubricating oil does not leak from the cylindrical bore 13. Accordingly, a bottom portion below the radial bearing gap is closely sealed, and any additional working can be avoided.

By selecting the value of the radial bearing gap within the range between 3 $\mu$m to 10 $\mu$m, in a condition that the lubricating oil is loaded in the cylindrical bore without providing any vent hole in the bearing member 4, the shaft 7 can easily be inserted into the cylindrical bore.

Figure 4:
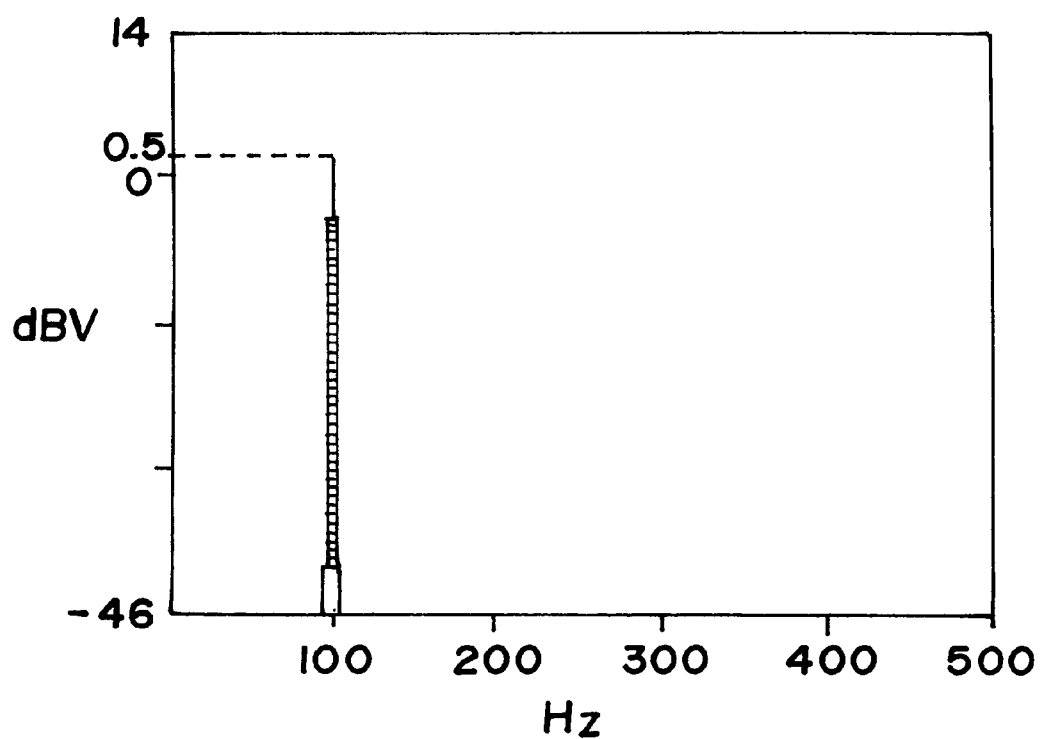
FIG. 4 is a graph showing test results of the present invention.

FIGS. 3 and 4 show test results for ascertaining occurrence of non-rotation component such as whirling.

In the tests, the outer diameter of the shaft 7 was selected to 3 mm, the value of the radial bearing gap was selected to 7 $\mu$m and the ratio of the axial lengths of the dynamic pressure generating grooves was selected to 3:4. As test conditions, an unbalance amount was set to 1 gf·cm and the numbers of revolutions were set to 3000 rpm and 6000 rpm. In the test method, the shaft 7 was greater than the turn table 15 by about 5 mm, and displacement (whirling amount) of the shaft was measured by an ADE microsensor (non-contact displacement measuring device of electrostatic capacity type), and measured results were analyzed by FFT (fast Fourier transform).

In case of 3000 rpm (i.e., 50 Hz), as shown in FIG. 3 indicating an output image of FFT, the displacement of the shaft was −8.7 dBV, and, in case of 6000 rpm (i.e., 100 Hz), as shown in FIG. 4, the displacement of the shaft was 0.5 dBV. In both test results, it was found that a non-rotation component greater than −46 dBV (0.025 $\mu$m0–p) is not generated (FIGS. 3 and 4 show primary non-rotation components). Accordingly, in the groove pattern according to the illustrated embodiment, it was found that almost no non-rotation component including the whirling is generated and there is no problem.

In this case, although a force for shifting the lubricating oil between the bearing member 4 and the shaft 7 toward the opening portion is generated, even in such a case, it was found that the whirling of the shaft 7 is not generated, and, thus, there is no practical problem.

(Second Embodiment)

Figure 5:
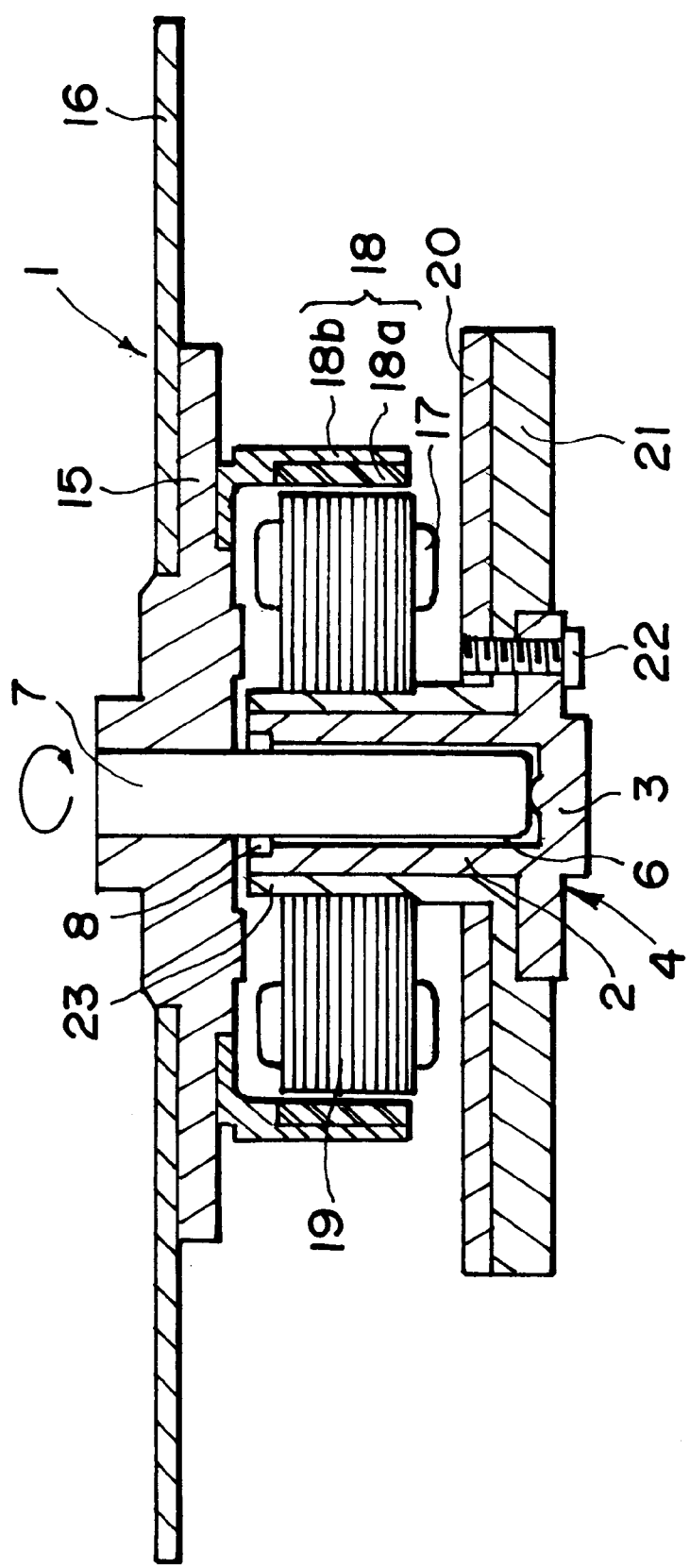
FIG. 5 is a sectional view of a dynamic pressure bearing apparatus according to a second embodiment of the present invention.
Figure 6:
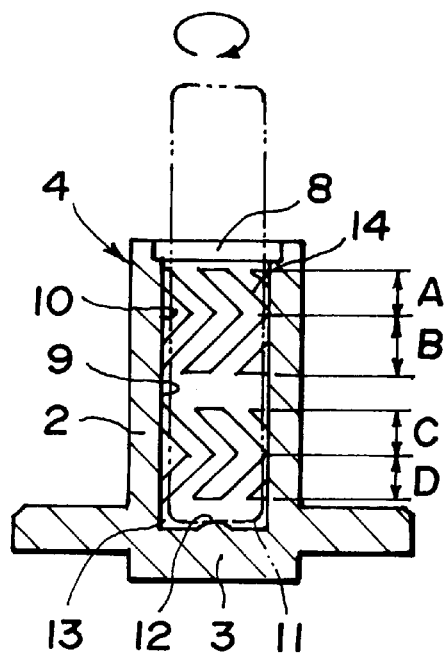
FIG. 6 is an enlarged view of a main part of FIG. 5.

FIG. 5 is a sectional view of a dynamic pressure bearing apparatus according to a second embodiment of the present invention, and FIG. 6 is a sectional view showing only a bearing portion of the second embodiment.

The second embodiment differs from the first embodiment in the point that a synthetic resin bearing member includes a radial bearing member 2 having dynamic pressure generating grooves 14 formed in a radial bearing surface 10, and a thrust bearing member 3 having a thrust bearing surface 12 contiguous to the radial bearing surface 10, and the bearing members 2, 3 are formed integrally with each other. The dynamic pressure generating grooves 14 are formed in the radial bearing surface 10 during the molding of the radial bearing member. Regarding the axial lengths of the dynamic pressure generating grooves 14, relationships A<B, C=D and (A+C)<(B+D) are satisfied. Similar to the first embodiment, preferably, (A+C):(B+D) is selected to 15:16 to 3:4.

When the shaft is rotated in a direction shown by the arrow, the dynamic pressure generating grooves 14 formed in the radial bearing surface 10 generate pressure. Since the shaft 7 is subjected to a radial direction force and a thrust direction force for urging the shaft 7 against the thrust bearing surface 12, the shaft 7 is not floating. By providing the bearing member as the resin integrated part in this way, the number of parts is decreased to make the apparatus cheaper, and excellent endurance due to low friction can be achieved.

Regarding the resin material, PPS (polyphenylene sulfide resin) including carbon fibers is preferable because of adequate strength and excellent wear-resistance, but, the resin is not limited to PPS and other appropriate resin material can be used.

Incidentally, when the radial bearing member 2 is made of resin, since bending rigidity may be insufficient, in the second embodiment, the radial bearing member 2 is fitted into a cylindrical portion 23 of the motor base 21 (formed from metal such as aluminium die casting, zinc die casting or metal plate), thereby reinforcing the radial bearing member 2. When adhesive is loaded in a space between the radial bearing member 2 and the cylindrical portion 23, the reinforcing effect is further enhanced.

(Third Embodiment)

Figure 7:
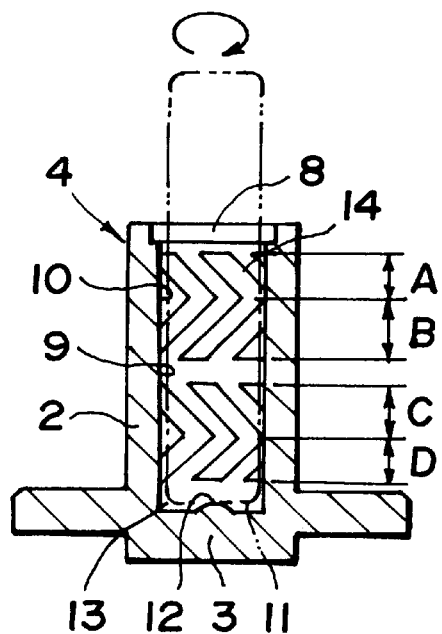
FIG. 7 is an enlarged view of a main part of a third embodiment of the present invention.

FIG. 7 is a sectional view showing a third embodiment of the present invention in which a bearing member 4 has a groove pattern different to that shown in FIG. 6. The axial lengths of the dynamic pressure generating grooves 14 shown in FIG. 7 satisfy relationships A<B, C>D and (A+C)<(B+D). Thus, when the shaft 7 is rotated in a direction shown by the arrow, the dynamic pressure generating grooves 14 formed in the radial bearing surface 10 generate pressure. Since the shaft 7 is subjected to a radial direction force and a thrust direction force for urging the shaft 7 against the thrust bearing surface 12, the shaft 7 is not floating. As is in the first and second embodiments, preferably, (A+C):(B+D) is selected to 15:16 to 3:4.

The other functions and effects are the same as those in the first embodiment.

By the way, if the outer diameter of the shaft 7 is smaller than 2 mm, the bending rigidity of the shaft may be insufficient, and, if the outer diameter of the shaft 7 is greater than 5 mm, required torque will be too great. If the outer diameter of the shaft is further increased, the entire dynamic pressure bearing apparatus becomes bulky, which is not suitable for a spindle motor.

If the value of the radial bearing gap is smaller than 3 µm, dynamic torque becomes great in a condition that a temperature of the lubricating oil is low; whereas, if the value of the radial bearing gap is greater than 10 µm, the dynamic torque can be reduced, but load capacity in the high temperature may be insufficient.

Further, in the dynamic pressure generating grooves 14 arranged in two rows, if the ratio between (A+C) and (B+D) is greater than 15:16, since the force for shifting the lubricating oil toward the opening portion is decreased accordingly, the thrust direction force for urging the shaft against the thrust bearing surface becomes insufficient. On the other hand, if the ratio between (A+C) and (B+D) is smaller than 3:4, since the force for shifting the lubricating oil toward the opening portion is increased accordingly, the bearing portion (particularly, lower part of the radial bearing and the thrust bearing) is subjected to negative pressure, with the result that the whirling is generated, thereby worsening the performance of the bearing. Main reasons for generating the whirling are that negative pressure is generated in the radial bearing gap and air enters into the radial bearing gap.

The groove pattern of the dynamic pressure generating grooves is not limited to the illustrated embodiment. So long as the groove width ratio for generating the thrust force for urging the shaft against the thrust bearing surface is maintained, and the axial lengths of the grooves for generating the force for shifting the lubricating oil toward the bottom is maintained, and the ratio of the axial lengths of the grooves for generating the force for shifting the lubricating oil toward the opening portion is selected to 15:16 to 3:4, any groove pattern may be used. The groove pattern of the dynamic pressure generating grooves may be formed either in the shaft or in the cylindrical bore.

According to the present invention, although the vent hole is omitted, since the radial bearing gap is selected to 3 µm to 10 µm, the shaft can easily be inserted into the cylindrical bore in the condition that the lubricating oil is loaded in the cylindrical bore. Further, since there is no vent hole and the bottom portion lower than the radial bearing gap is closely sealed, the lubricating oil can surely be loaded and does not leak.

As a result that the outer diameter of the shaft is selected to 2 mm to 5 mm, the bending rigidity required for the shaft is maintained, and the required torque is prevented from becoming too great.

Further, since the force for shifting the lubricating oil between the bearing member and the shaft toward the opening portion is generated by selecting the ratio of the axial lengths of the dynamic pressure generating grooves to 15:16 to 3:4, the shaft is not floating and the non-rotation component including the whirling is not generated. Thus, by supporting the disc by using this bearing apparatus, the disc is not contacted with the recording/reproducing head to damage the disc, and high performance and excellent endurance can be ensured.

(Fourth Embodiment)

Figure 8:
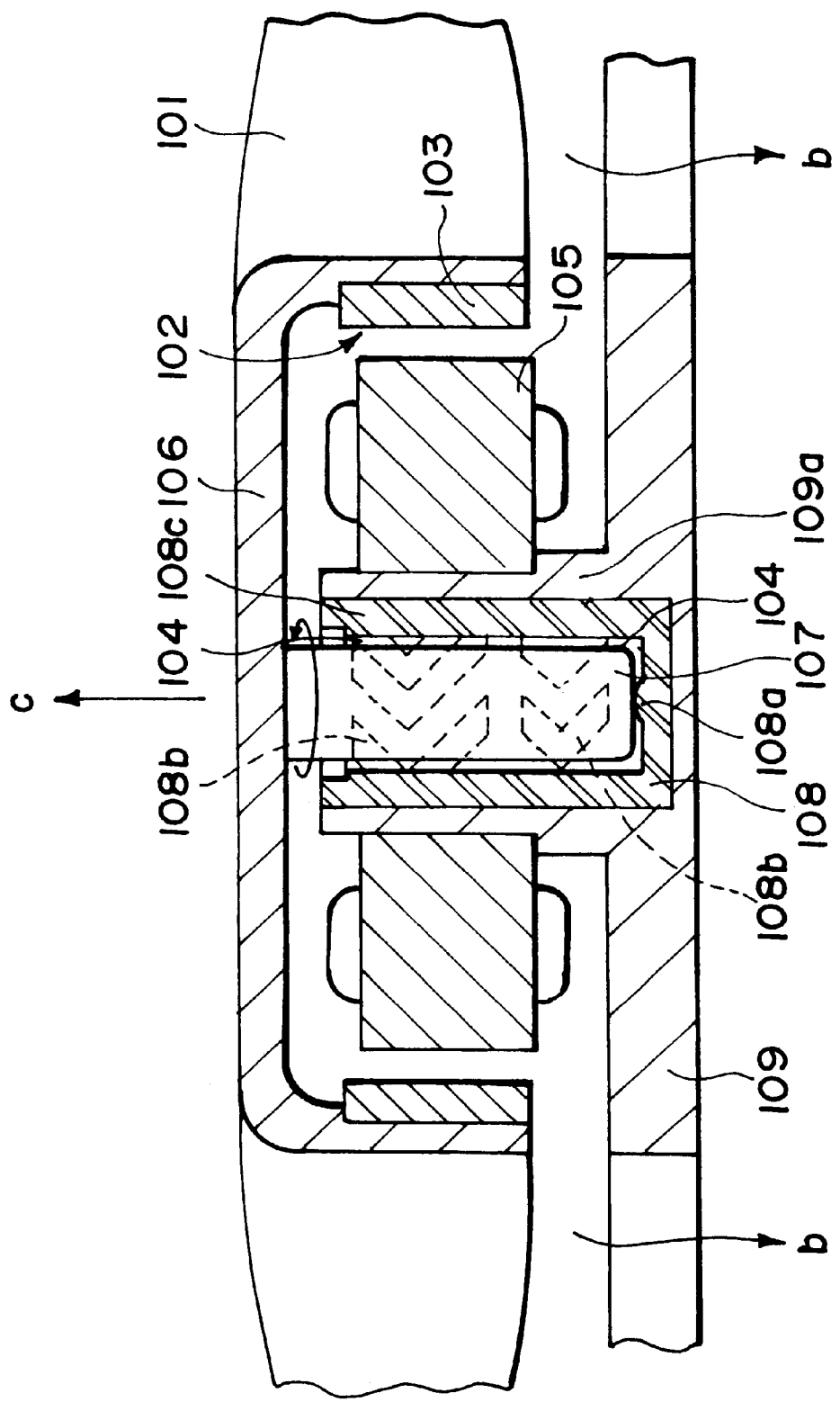
FIG. 8 is a sectional view of a dynamic pressure bearing apparatus for a fan motor according to a fourth embodiment of the present invention.

FIG. 8 is a sectional view of a dynamic pressure bearing apparatus for a fan motor according to a fourth embodiment of the present invention. FIG. 9 is a sectional view showing a dynamic pressure bearing portion of FIG. 8. A plurality of vanes 101 are secured to an outer peripheral surface of a support member 106 and are equidistantly spaced apart from each other in a circumferential direction, and a rotor 102 is secured to an inner peripheral surface of the support member 106. A cylindrical portion 109a is provided on a central portion of a case 109, and a stator 105 is provided on an outer peripheral surface of the cylindrical portion 109a in a confronting relation to the rotor 102. A cylindrical resin sleeve 108 having a bottom is secured within the cylindrical portion 109a. A rotary shaft 107 having one end to which the vanes 101 and the rotor 102 are secured via the support member 106 is rotatably and detachably fitted into a fitting portion 108c with a predetermined radial gap. The resin sleeve 108 constitutes a radial/thrust integrating resin dynamic pressure bearing including a radial dynamic pressure bearing portion having dynamic pressure generating grooves 108b formed in an inner peripheral surface of the sleeve, and a thrust bearing portion contiguous to the radial bearing portion and formed on the bottom of the sleeve. That is to say, the dynamic pressure generating grooves 108b formed in the inner peripheral surface of the resin sleeve 108 and a convex spherical face 108a (center of the thrust bearing) formed on the bottom of the resin sleeve 108 constitute the radial/thrust integrating resin dynamic pressure bearing. The gap between the rotary shaft 107 and the bearing surface of the radial/thrust integrating resin dynamic pressure bearing is filled with oil 104 as lubricating agent.

The rotor 102 is rotated in a direction shown by the arrow a by rotating magnetic field generated by the stator 105 so that air is sent to a direction shown by the arrow b by the vanes 101 provided on the outer peripheral surface of the rotor. During this rotation, the dynamic pressure generating grooves 108b formed in the inner peripheral surface of the resin sleeve 108 generate pressure in the oil 104 to support the shaft in the radial direction, so that the shaft 107 is rotated without contacting with the fitting portion 108c. During the air blasting, a thrust load (shown by the arrow c) acting on the rotary shaft 107 as a reaction force of the blasting action of the vanes 101 is supported by dynamic pressure (generated by the dynamic pressure generating grooves 108b) directing toward a direction opposite to a direction of a thrust force of the vanes 101.

FIG. 9 is a sectional view of the resin sleeve 108. The groove pattern of the dynamic pressure generating grooves according to the first embodiment is applied to this embodiment. Thus, the widths of the dynamic pressure generating grooves 108b formed in the inner peripheral surface of the resin sleeve 108 in two rows satisfies relationships A<B and C<D, and the widths of the lower groove portions are greater than the widths of the upper groove portions in both two rows. Accordingly, a relationship (A+C)<(B+D) is established. When the rotor 102 is rotated in the direction a, dynamic pressure for supporting the rotary shaft 107 in the radial direction and dynamic pressure (force urging the rotary shaft 107 toward the thrust bearing) for directing toward a direction opposite to the thrust force of the vanes 101 are generated by the dynamic pressure generating grooves 108b, thereby preventing the shaft 107 from floating. In this case, the thrust load is supported by a point contact between the end surface of the rotary shaft 107 and the convex spherical face 108a of the thrust bearing. Although the thrust force of the vanes 101 is increased as the number of revolutions of the rotary shaft 107 is increased, since the dynamic pressure is also increased as the number of revolutions of the rotary shaft 107 is increased, the shaft is prevented from floating even as the number of revolutions increases. By providing the dynamic pressure generating grooves 108b having such a groove pattern, it is not required that the stator 105 is offset from the rotor 102 so that the attracting force obtained by the stator 105 and the magnet 103 becomes greater than the thrust force of the vanes 101 by a predetermined rate.

By providing the groove pattern of the dynamic pressure generating grooves 108b formed in the inner peripheral surface of the sleeve capable of supporting the load in the radial direction and generating the force acting toward the axial direction opposite to the thrust force of the vanes, since the construction can be simplified and the axial dimension can be reduced, the entire apparatus can be made compact (thinner). Further, since such a groove pattern is used, it is not required that the stator is greatly offset from the rotor in the axial direction, with the result that, since the vanes are not vibrated in the axial direction, noise is not generated. Since the end surface of the rotary shaft 107 and the convex spherical face of the thrust bearing surface are point-contacted with each other to support the thrust load, low friction is attained so that the edge of the rotary shaft 107 does not damage the thrust bearing surface. According to the construction of the present invention, since the radial/thrust integrating resin bearing is used, starting friction resistance can be reduced (the shaft 107 is contacted with the inner surface of the sleeve at the starting and stopping), with the result that the entire bearing has low friction, excellent wear-resistance and high performance. By using the oil as the lubricating agent, the air in the bearing can easily be expelled during insertion of the rotary shaft 107 into the fitting portion 108c. Thus, since almost no air remains within the bearing, performance of the dynamic pressure bearing is preserved. When the oil is used as the lubricating agent, torque can be reduced in comparison with grease.

(Fifth and Sixth Embodiments)

Figure 11:
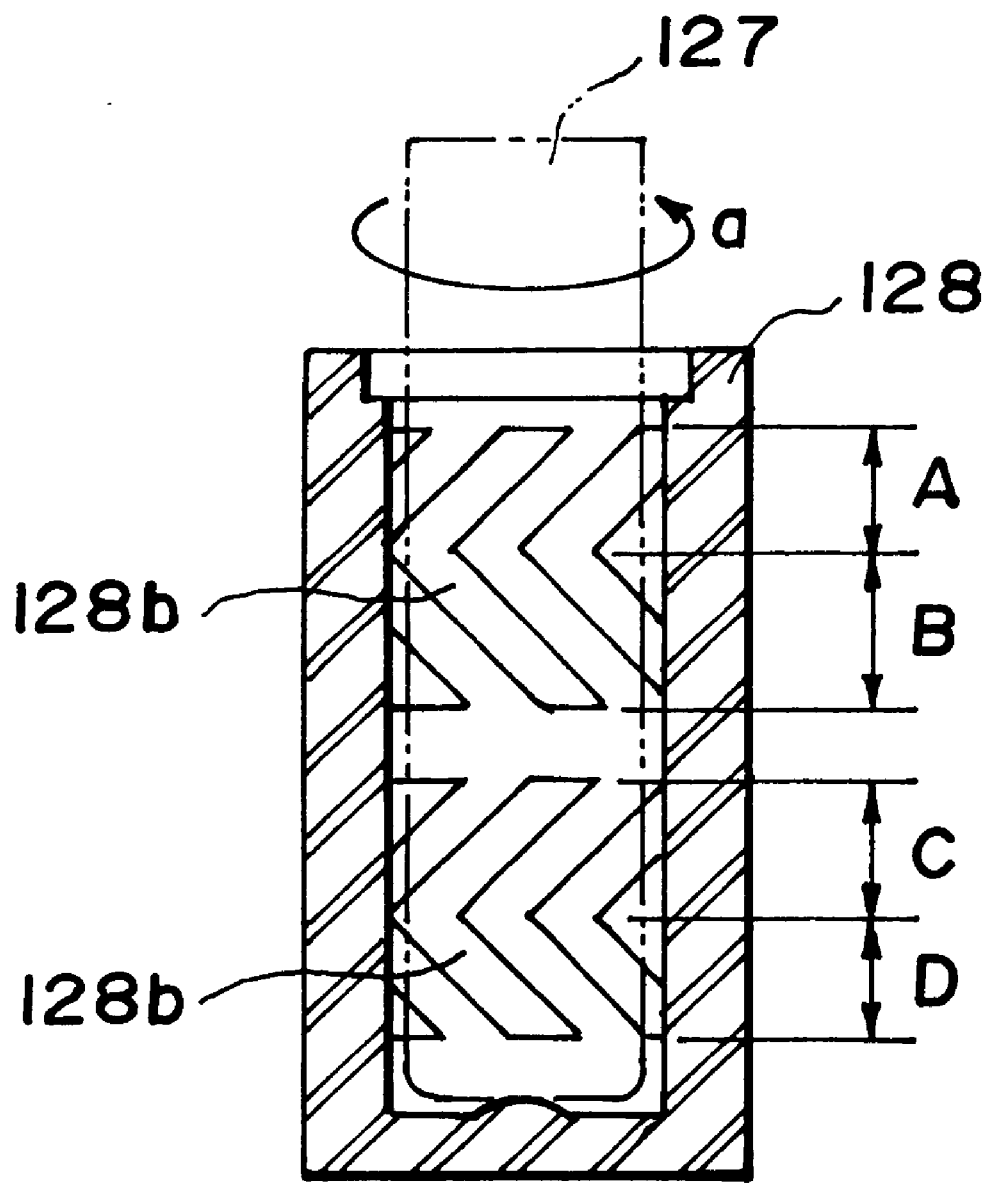
FIG. 11 is a sectional view of a resin sleeve (bearing portion) showing a groove pattern of dynamic pressure generating grooves according to a sixth embodiment of the present invention.

FIG. 10 is a sectional view of a resin sleeve (bearing portion) having a groove pattern of dynamic pressure generating grooves according to a fifth embodiment of the present invention. FIG. 11 is a sectional view of a resin sleeve (bearing portion) having a groove pattern of dynamic pressure generating grooves according to a sixth embodiment of the present invention. The groove pattern according to the fifth embodiment corresponds to the groove pattern of the second embodiment, and widths of dynamic pressure generating grooves 118b formed in a resin sleeve 118 shown in FIG. 10 satisfy relationships A<B and C=D. The groove pattern provided in a resin sleeve 128 of the sixth embodiment shown in FIG. 11 corresponds to the groove pattern of the third embodiment, and widths of dynamic pressure generating grooves 128b satisfy relationships A<B and C>D. In both cases, since (A+B)<(C+D), when a shaft 117 (FIG. 10) or 127 (FIG. 11) is rotated in a direction shown by the arrow a, dynamic pressure for supporting the shaft in the radial direction and dynamic pressure (force urging the rotary shaft toward the thrust bearing) for directing toward a direction opposite to a thrust force of vanes are generated by the dynamic pressure generating grooves 118b or 128b, thereby preventing a shaft 117 or 127 from floating. The groove pattern of the dynamic pressure generating grooves is not limited to those shown in the fourth to sixth embodiments, but, any groove pattern and groove width ratio may be used so long as the thrust force of the vanes and the dynamic pressure (force for urging the rotary shaft toward the thrust bearing (opposite to the thrust force of the vanes) are generated. In the fifth and sixth embodiments, since only the groove patterns thereof differ and the other constructions are the same as those in the fourth embodiment, the same effect as the fourth embodiment can be achieved.

In the fourth to sixth embodiments, the resin sleeve is made of PPS (polyphenylene sulfide resin) including carbon fibers. However, the resin material is not limited to PPS, but any resin material having adequate strength and excellent wear-resistance may be used to form the resin sleeve. Further, the cross-section of the resin sleeve is not limited to the circle as shown in the fourth to sixth embodiments, but may be square or rectangular, and a flange may be formed on the outer surface of the sleeve. In addition, the dynamic pressure generating grooves are not limited to those shown in the embodiments, and any grooves capable of generating dynamic pressure for supporting the shaft in the radial direction and dynamic pressure acting toward a direction opposite to the thrust force of the vanes may be used. Further, the dynamic pressure generating grooves may be arranged in a single row.

According to one embodiment of the present invention, by providing the radial/thrust integrating resin dynamic pressure bearing formed by injection molding and including the dynamic pressure radial bearing portion having the dynamic pressure generating grooves formed in the cylindrical member and the thrust bearing portion contiguous to the radial bearing portion and formed on the bottom of the cylindrical member, since the dynamic pressure generating grooves can be formed simultaneously by the injection molding, the manufacture can be facilitated and the number of parts can be reduced. Since the rotary shaft is detachably inserted into the fitting portion, the assembling can be effected easily and cheaply, and the replenishment of the lubricating oil can be facilitated to permit easy maintenance. Further, by providing the groove pattern of the dynamic pressure generating grooves formed in the inner peripheral surface of the sleeve capable of supporting the shaft in the radial direction and generating the force acting toward the axial direction opposite to the thrust force of the vanes, since the construction can be simplified and the axial dimension can be reduced, the entire apparatus can be made compact (thinner). Since it is not required that the stator is greatly offset from the rotor in the axial direction, noise due to vibration of the shaft (vanes) is not generated. Further, since the radial/thrust integrating resin bearing is used and the thrust load is supported in a point contact fashion by providing the convex spherical face on one of the end surface of the rotary shaft and the thrust bearing surface, low friction is ensured so that the edge of the shaft does not damage the thrust bearing surface. By using the oil as the lubricating agent, the air in the bearing can easily be expelled during insertion of the rotary shaft. Thus, since almost no air remains within the bearing, performance of the dynamic pressure bearing is preserved. When the oil is used as the lubricating agent, torque can be reduced in comparison with grease.

(Seventh Embodiment)

Figure 12:
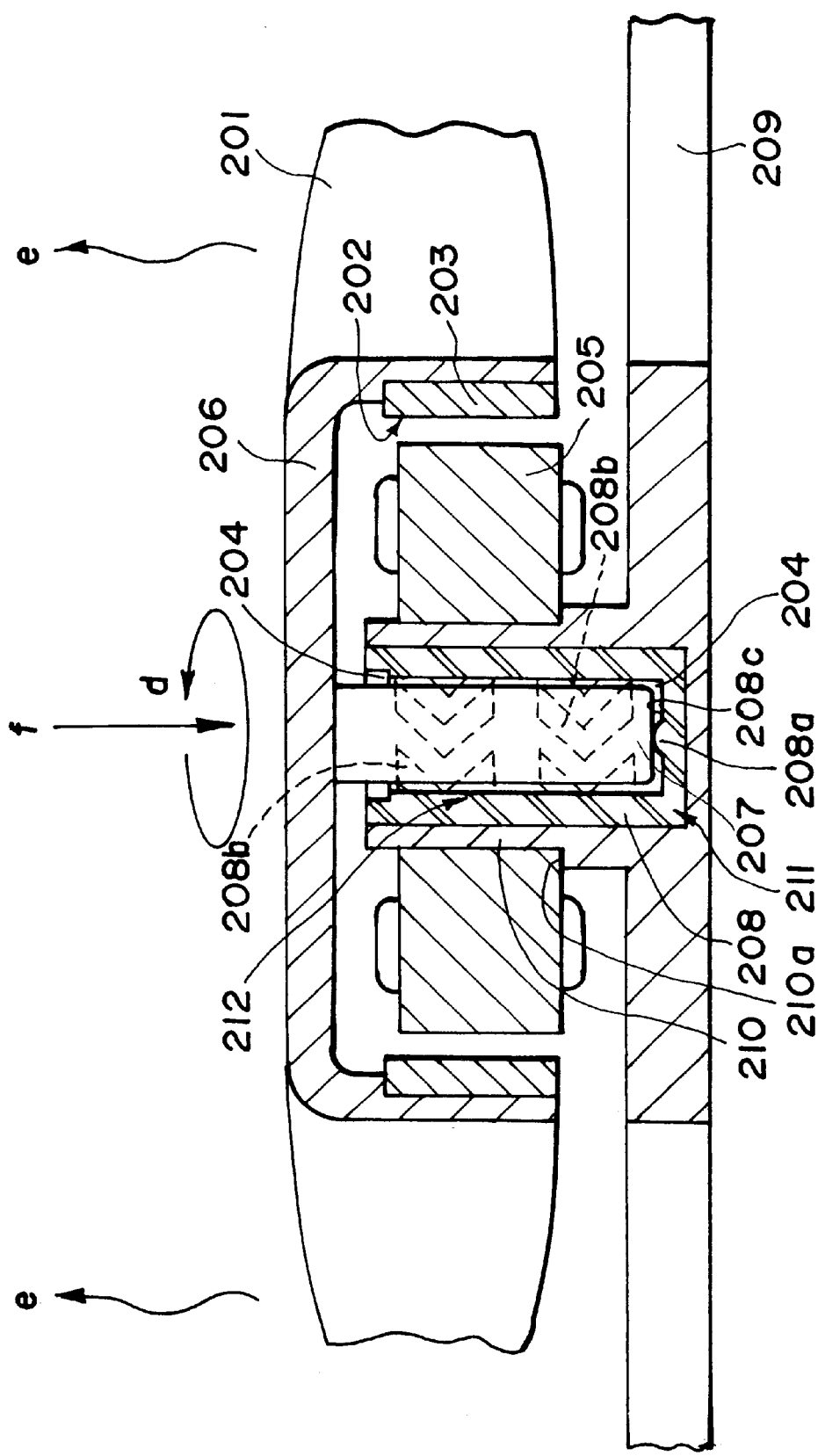
FIG. 12 is a sectional view of a dynamic pressure bearing apparatus for a fan motor according to a seventh embodiment of the present invention.

FIG. 12 is a sectional view of a dynamic pressure bearing apparatus for a fan motor according to a seventh embodiment of the present invention. A cylindrical portion 210 extending in an axial direction is provided at a central portion of a case 209, and a stator 205 is positioned around an outer peripheral surface of the cylindrical portion 210 by a stepped portion 210a. A resin sleeve 208 having a bottom is secured to (press-fitted into) an inner peripheral surface of the cylindrical portion 210. The other free end portion of a rotary shaft 207 having one end to which vanes 201 and a rotor 202 are secured via a support member 206 is detachably inserted into the substantially cylindrical resin sleeve 208 with a predetermined radial gap therebetween. The resin sleeve 208 has a radial dynamic pressure bearing portion 212 (in two rows) having dynamic pressure generating grooves 208b formed in the inner peripheral surface of the sleeve and a thrust bearing portion 211 contiguous to the radial bearing portion and having a convex spherical face 208a formed on the bottom of the cylindrical portion (sleeve), thereby constituting a radial/thrust integrating resin dynamic pressure bearing. In this arrangement, the stator 205 provided on the outer peripheral surface of the cylindrical portion 210 is opposed to the rotor 202, and the shaft 207 to which the rotor 202 is secured is rotatably supported within the stator 205. The bearing gap defined between the rotary shaft 207 and the radial/thrust integrating resin dynamic pressure bearing is filled with oil 204 as lubricating agent. Thus, air can be expelled from the interior of the bearing (air does not readily remain within the bearing). The rotor 202 is rotated (in a direction shown by the arrow d) by a rotating magnetic field generated by the stator 205. Pressure is generated in the oil 204 by the dynamic pressure generating grooves 208b formed in the inner peripheral surface of the resin sleeve 208, so that the rotary shaft 207 is supported in the radial direction and is rotated without contacting with the inner peripheral surface of the resin sleeve 208. The air is sent in a direction shown by the arrow e by the vanes 201 provided on the outer surface of the support member 206. During the air blasting a thrust load (directing toward a direction f) acting on the rotary shaft 207 as a reaction force of the blasting action of the vanes 201 is a thrust force generated by rotation of the vanes 201. The thrust force (thrust load) is generated to direct toward the thrust bearing portion 211, with the result that the end surface of the rotary shaft 207 is point-contacted with the convex spherical face 208a on the thrust bearing portion 211.

In this way, by providing the radial/thrust integrating resin dynamic pressure bearing formed by injection molding and including the dynamic pressure radial bearing portion having the dynamic pressure generating grooves 208b formed in the inner peripheral surface of the resin sleeve 208 and the thrust bearing portion 211 contiguous to the radial bearing portion and formed on the bottom of the cylindrical portion, since the dynamic pressure generating grooves can be formed simultaneously by the injection molding, the manufacture and assembling can be facilitated and the number of parts can be reduced. Further, since the thrust force obtained by the rotation of the vanes 201 is generated to direct toward the thrust bearing portion 211, it is not required that a force for attracting the rotor 202 in the axial direction (toward the thrust bearing portion 211) becomes greater than the thrust force. Thus, since it is not required that the stator is greatly offset from the rotor in the axial direction, noise is not generated, and, since the construction can be simplified and the axial dimension can be reduced, the entire dynamic pressure bearing apparatus for a fan motor can be made compact (thinner).

Further, since the radial/thrust integrating resin bearing is used and the thrust load is supported in a point contact fashion by providing the convex spherical face 208a on one of the end surface of the rotary shaft 207 and the thrust bearing surface 208c, low friction is ensured so that the edge of the shaft does not damage the thrust bearing surface. Since the radial dynamic pressure bearing is also formed from resin, starting friction resistance can be reduced (the shaft 207 is contacted with the inner surface of the sleeve at the starting and stopping), with the result that the entire bearing has low friction and excellent wear-resistance. By using the oil 204 as the lubricating agent, the air in the bearing can easily be expelled during insertion of the rotary shaft 207. Thus, since almost no air remains within the bearing, performance of the dynamic pressure bearing is preserved. When oil is used as the lubricating agent, torque can be reduced in comparison with grease.

(Eighth Embodiment)

Figure 13:
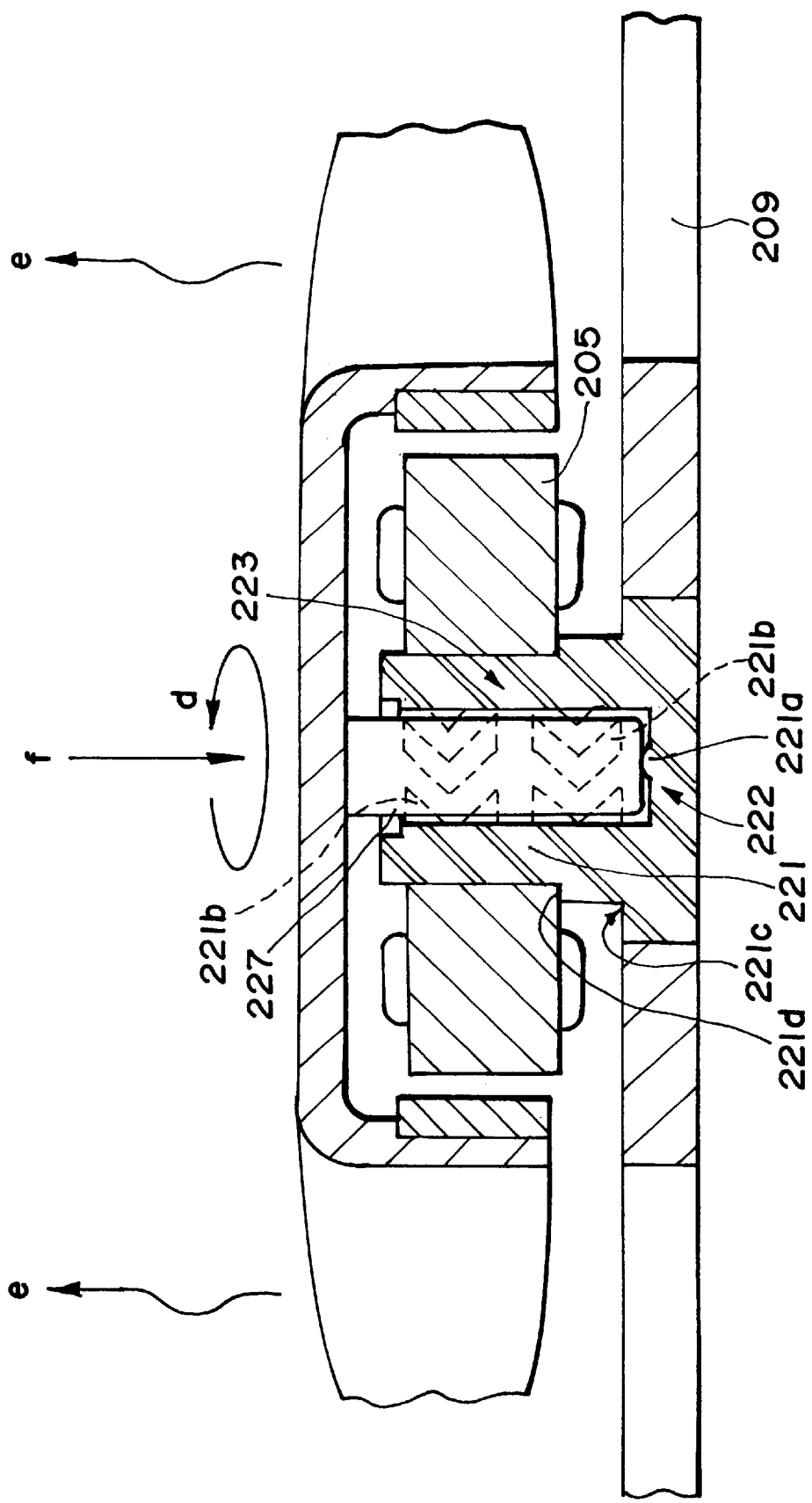
FIG. 13 is a sectional view of a dynamic pressure bearing apparatus for a fan motor according to an eighth embodiment of the present invention.
Figure 16:
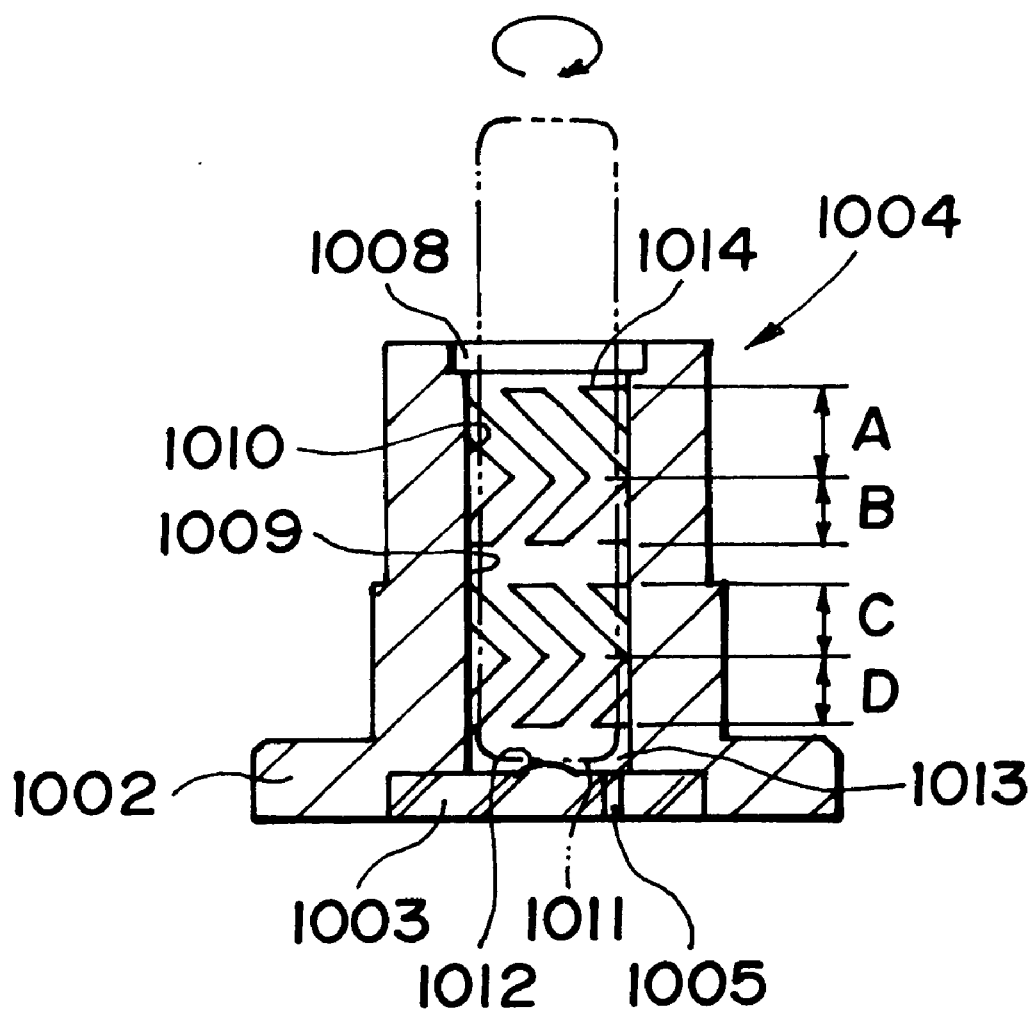
FIG. 16 is an enlarged view of a main part of FIG. 15.
Figure 17:
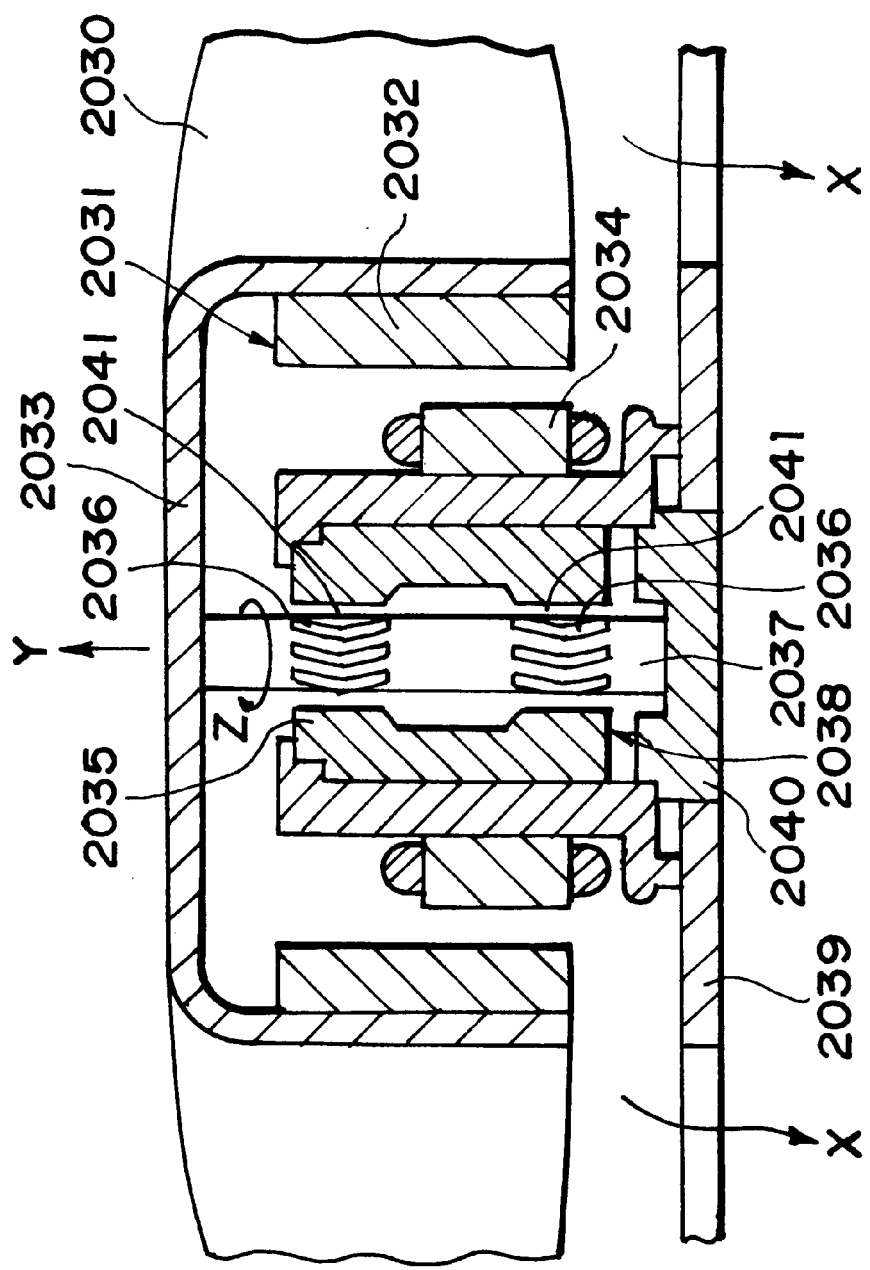
FIG. 17 is a sectional view of a conventional dynamic pressure bearing apparatus for a fan motor.

FIG. 13 is a sectional view of a dynamic pressure bearing apparatus for a fan motor according to an eighth embodiment of the present invention. The eighth embodiment differs from the seventh embodiment in the points that the cylindrical portion extending in the axial direction is omitted from the central portion of the case 209 and a resin sleeve 221 of a radial/thrust integrating resin bearing is provided with a flange 221c. A rotary shaft 227 is rotatably and detachably inserted into a cylindrical portion (substantially cylindrical portion) of the resin sleeve 221 with a predetermined radial gap therebetween. The resin sleeve 221 has a radial dynamic pressure bearing portion 223 (in two rows) having dynamic pressure generating grooves 221b formed in the inner peripheral surface of the sleeve and a thrust bearing portion 222 contiguous to the radial bearing portion and having a convex spherical face 221a formed on the bottom of the cylindrical portion (sleeve), thereby constituting a radial/thrust integrating resin dynamic pressure bearing. The flange 221c is secured to the case 209 by press-fit or the like. An outer peripheral surface of the resin sleeve 221 is provided with a stepped portion 221d on which a stator 205 is positioned so that the stator 205 is directly fitted onto the outer peripheral surface of the resin sleeve 221. With this arrangement the construction of the dynamic pressure bearing apparatus for a fan motor including the case 209 is simplified, thereby reducing the manufacturing cost. The other constructions and functions are the same as those in the seventh embodiment.

(Ninth Embodiment)

FIGS. 14A to 14D are sectional views showing a resin sleeve (dynamic pressure bearing portion) according to a ninth embodiment of the present invention. FIG. 14A is a sectional view of a resin sleeve (dynamic pressure bearing portion) having a first example of dynamic pressure generating grooves. FIG. 14B is a sectional view of a resin sleeve (dynamic pressure bearing portion) showing a second example of dynamic pressure generating grooves. FIG. 14C is a sectional view of a resin sleeve (dynamic pressure bearing portion) showing a third example of dynamic pressure generating grooves. FIG. 14D is a sectional view showing a fourth example of dynamic pressure generating grooves, in which the grooves are arranged in a single row.

In FIG. 14A, a thrust bearing surface (thrust receiving portion) of a thrust bearing portion 230 at a bottom is provided at its central portion with a convex spherical face 218a. Widths of the dynamic pressure generating grooves 218b in two rows satisfy relationships A>B and C>D, and, in both two rows, widths of upper groove portions are greater than widths of lower groove portions. That is to say, in the groove pattern, as a whole, the widths of upper groove portions are greater than widths of lower groove portions. As a result, a relationship (A+C)>(B+D) is satisfied. During the operation of a radial/thrust integrating resin dynamic pressure bearing 219, although a radial force (radial direction force) and a thrust force (axial direction force) are generated, the thrust force generated by this groove pattern is set to become smaller than the thrust force generated by the rotation of the vanes (groove width ratio).

When a rotary shaft 237 is rotated in a direction shown by the arrow d, the dynamic pressure generating grooves 218b generate dynamic pressure for supporting the rotary shaft 237 in the radial direction and a thrust force (force (g) for floating the rotary shaft 237 from a thrust bearing direction) directing toward a direction opposite to the thrust force (force (f) generated in the axial direction) generated by the rotation of the vanes. In this case, the thrust force (g) generated by the dynamic pressure generating grooves 218b is smaller than the thrust force (f) generated by the rotation of the vanes, and a thrust load obtained by subtracting the thrust force (g) generated by the dynamic pressure generating grooves 218b from the thrust force (f) generated by the rotation of the vanes is supported by the end surface of the rotary shaft 237 and the convex spherical face 218a of the thrust bearing portion 230 in a point-contact fashion. Although the thrust force generated by the rotation of the vanes is increased as the number of revolutions is increased, since the thrust force generated by the dynamic pressure generating grooves 218b is also increased as the number of revolutions is increased, fluctuation of the thrust load due to the number of revolutions is small. In this way, the thrust force generated by the rotation of the vanes is balanced with the thrust force generated by the dynamic pressure generating grooves 218b. Thus, the thrust load can be supported by the point-contact between the end surface of the rotary shaft 237 and the convex spherical face 218a of the thrust bearing portion 230, thereby reducing the rotational torque. Also, wear of the end surface of the rotary shaft 237 and the thrust bearing surface 218c can be reduced. The other functions and effects are the same as those in the seventh and eighth embodiments.

Widths of the dynamic pressure generating grooves 228b shown in FIG. 14B satisfy relationships A>B and C=D, and widths of the dynamic pressure generating grooves 238b shown in FIG. 14C satisfy relationships A>B and C<D. But in both cases, a relationship (A+C)>(B+D) is satisfied. Therefore, the same functions and effects as those in the example shown in FIG. 14A can be achieved. The other functions and effects are the same as those in the seventh and eighth embodiments.

Widths of the dynamic pressure generating grooves 248b (in single row) formed in an inner peripheral surface of a cylindrical portion of a flange 248 shown in FIG. 14D satisfy a relationship A>B. Also in this case, widths of upper groove portions are greater than widths of lower groove portions. Thus, similar to the groove patterns shown in FIGS. 14A, 14B and 14C, when a rotary shaft 247 is rotated (in a direction shown by the arrow d), the dynamic pressure generating grooves 248b generate dynamic pressure for supporting the rotary shaft 247 in the radial direction and a thrust force (force (g) for floating the rotary shaft 247 from a thrust bearing portion 250) directing toward a direction opposite to the thrust force (force (f) generated to direct toward the thrust bearing portion 250) generated by the rotation of the vanes. A thrust load (obtained by subtracting the force (g) (for floating the rotary shaft 247 from a thrust bearing portion 250) generated by the dynamic pressure generating grooves. 248b from the force (f) (generated to direct toward the thrust bearing portion 250) generated by the rotation of the vanes) is supported by the end surface of the rotary shaft 247 and a convex spherical face 248a of the thrust bearing portion 250 in a point-contact fashion. In construction, the example shown in FIG. 14D differs from the examples shown in FIGS. 14A, 14B and 14C only in the point that the dynamic pressure generating grooves are arranged in the single row. Therefore, the same functions and effects as the examples shown in FIGS. 14A, 14B and 14C can be achieved. The other functions and effects are the same as those in the seventh and eighth embodiments.

In the embodiments of the present invention, the resin sleeve is made of PPS (polyphenylene sulfide resin) including carbon fibers. However, the resin material is not limited to PPS, but any resin material having adequate strength and excellent wear-resistance may be used to form the resin sleeve. Further, the cross-section of the resin sleeve is not limited to the circle as shown in the embodiments, but may be square for easy working. A flange may be formed on the outer surface of the sleeve. In addition, the groove pattern is not limited to those shown in the embodiments, any groove pattern (and groove width ratio) capable of generating dynamic pressure (for floating the shaft from the thrust bearing direction) opposed to the thrust force generated by the rotation of the vanes may be used.

According to one embodiment of the present invention, by providing the radial/thrust integrating resin dynamic pressure bearing formed by injection molding and including the dynamic pressure radial bearing portion having the dynamic pressure generating grooves formed in the cylindrical portion and the thrust bearing portion contiguous to the radial bearing portion and formed on the bottom of the cylindrical portion, the manufacture and assembling can be facilitated and the number of parts can be reduced, thereby making the apparatus cheaper. Since the thrust force generated by the rotation of the vanes is directed toward the thrust bearing portion, it is not required that a force for attracting the rotor in the axial direction (toward the thrust bearing portion) is greater than the thrust force. Thus, it is not required that the stator is greatly offset from the rotor in the axial direction. Therefore, the vanes are not readily vibrated in the axial direction, thereby preventing the noise. Since the construction can be simplified and the axial dimension can be reduced, the entire dynamic pressure bearing apparatus can be made compact (thinner). Further, since the radial/thrust integrating resin bearing is used and the thrust load is supported in a point contact fashion by providing the convex spherical face on one of the end surface of the-rotary shaft and the thrust bearing surface, low friction is ensured so that the edge of the shaft does not damage the thrust bearing surface. Since the radial dynamic pressure bearing is also formed from resin, starting friction resistance can be reduced (the shaft is contacted with the inner surface of the sleeve at the starting and stopping), with the result that the entire bearing has low friction and excellent wear-resistance. By using oil as the lubricating agent, the air in the bearing can easily be expelled during insertion of the rotary shaft. Thus, since almost no air remains within the bearing, performance of the dynamic pressure bearing is preserved. When oil is used as the lubricating agent, torque can be reduced in comparison with grease.

According to another embodiment of the present invention, since the thrust force (for floating the shaft from the thrust bearing portion) generated by the dynamic pressure generating grooves formed in the inner peripheral surface of the cylindrical portion is smaller than the thrust force (directing toward the thrust bearing portion) generated by the rotation of the vanes, and a thrust load obtained by subtracting the axial force generated by the dynamic pressure generating grooves from the thrust force generated by the rotation of the vanes is supported by the end surface of the rotary shaft and the thrust bearing surface in a point-contact fashion, the thrust load becomes smaller, thereby achieving low torque and low friction.

What is claimed is:

1. A dynamic pressure bearing apparatus comprising:
a bearing member having a thrust bearing surface provided at a bottom of a cylindrical bore, a radial bearing surface provided on an inner peripheral surface portion of said cylindrical bore, and a lubricating oil reservoir provided at an opening portion of said cylindrical bore, an inner peripheral surface of said lubricating oil reservoir having a diameter greater than that of said radial bearing surface and being connected to said inner peripheral surface portion of said cylindrical bore by a substantially radial step surface; and
a rotary shaft disposed within said cylindrical bore and having a radial receiving surface opposed to said radial bearing surface with the interposition of a radial bearing gap, and a thrust receiving surface opposed to said thrust bearing surface; and wherein
said bearing member is closed at the bottom thereof, a dynamic pressure generating groove is formed in at least one of said radial bearing surface and said radial receiving surface, and said dynamic pressure generating groove generates a force for flowing lubricating oil between said bearing member and said rotary shaft toward said opening portion of said cylindrical bore.

2. A dynamic pressure bearing apparatus according to claim 1, wherein an outer diameter of said rotary shaft is 2 mm to 5 mm, and said radial bearing gap is 3 $\mu$m to 10 $\mu$m, and each of said dynamic pressure generating grooves has a laid V-shaped configuration in which a ratio between an axial length of a groove portion extending from a bent portion of the "V" toward said opening portion of said cylindrical bore and an axial length of a groove portion extending from said bent portion toward the bottom of said cylindrical bore is selected to be from 15:16 to 3:4.

3. A dynamic pressure bearing apparatus according to claim 1, wherein said bearing member is cylindrical.

4. A dynamic pressure bearing apparatus for a fan motor, comprising:
a bearing member having a thrust bearing surface provided at a bottom of a cylindrical bore, a radial bearing surface provided on an inner peripheral surface, and a lubricating oil reservoir provided at an opening portion of said cylindrical bore and having a diameter greater than that of said radial bearing surface; and
a rotary shaft disposed within said cylindrical bore and having one end rotatably supporting a vane and a rotor and another end having a thrust receiving surface opposed to said thrust bearing surface, the rotary shaft having a radial receiving surface opposed to said radial bearing surface with the interposition of a radial bearing gap, and wherein
a stator is disposed around said bearing member in a confronting relation to said rotor; said bearing member is made of resin and is closed at its bottom; a dynamic pressure generating groove is formed in at least one of said radial bearing surface and said radial receiving surface; a thrust force generated by rotation of said vane is directed away from said thrust bearing surface; and a spherical face is formed on one of said another end of said rotary shaft and said thrust bearing surface.

5. A dynamic pressure bearing apparatus for a fan motor according to claim 4, wherein said bearing member is cylindrical.

6. A dynamic pressure bearing apparatus for a fan motor according to claim 4, wherein said dynamic pressure generating groove has a groove pattern for generating a force directing toward an axial direction opposite to a direction of the thrust force generated by the rotation of said vane, and the axial force generated by said dynamic pressure generating groove is greater than the thrust force generated by the rotation of said vane.

7. A dynamic pressure bearing apparatus comprising:
a bearing member having a thrust bearing surface provided at a bottom of a cylindrical bore, a radial bearing surface provided on an inner peripheral surface portion of said cylindrical bore, and a lubricating oil reservoir provided at an opening portion of said cylindrical bore, an inner peripheral surface of said lubricating oil reservoir having a diameter greater than that of said radial bearing surface and being connected to said inner peripheral surface portion of said cylindrical bore by a substantially radial step surface; and
a rotary shaft rotatably disposed within said cylindrical bore and having a radial receiving surface opposed to said radial bearing surface with the interposition of a radial bearing gap, and a thrust receiving surface opposed to said thrust bearing surface,
wherein said bearing member is closed at the bottom thereof, a dynamic pressure generating groove is formed in at least one of said radial bearing surface and said radial receiving surface, and when said rotary shaft is rotated said dynamic pressure generating groove applies a thrust force to said rotary shaft in a direction toward the thrust bearing surface.

8. A dynamic pressure bearing apparatus according to claim 7, wherein said bearing member is cylindrical.

9. A dynamic pressure bearing apparatus comprising:
a bearing member having a thrust bearing surface provided at a bottom of a cylindrical bore, a radial bearing surface provided on an inner peripheral surface, and a lubricating oil reservoir provided at an opening portion of said cylindrical bore and having a diameter greater than that of said radial bearing surface; and
a rotary shaft disposed within said cylindrical bore and having a radial receiving surface opposed to said radial bearing surface with the interposition of a radial bearing gap, and a thrust receiving surface opposed to said thrust bearing surface;
wherein said bearing member is closed at the bottom thereof, a dynamic pressure generating groove is formed in at least one of said radial bearing surface and said radial receiving surface, and said dynamic pressure generating groove generates a force for flowing lubricating oil between said bearing member and said rotary shaft toward said opening portion of said cylindrical bore; and
wherein an outer diameter of said rotary shaft is 2 mm to 5 mm, and said radial bearing gap is 3 $\mu$m to 10 $\mu$m, and each of said dynamic pressure generating grooves has a laid V-shaped configuration in which a ratio between an axial length of a groove portion extending from a bent portion of the "V" toward said opening portion of said cylindrical bore and an axial length of a groove portion extending from said bent portion toward the bottom of said cylindrical bore is selected to be from 15:16 to 3:4.

10. A dynamic pressure bearing apparatus according to claim 9, wherein said bearing member is cylindrical.

* * * * *